United States Patent
Asanuma et al.

(10) Patent No.: US 9,548,621 B2
(45) Date of Patent: Jan. 17, 2017

(54) CONTACTLESS CONNECTOR SYSTEM TOLERANT OF POSITION DISPLACEMENT BETWEEN TRANSMITTER COIL AND RECEIVER COIL AND HAVING HIGH TRANSMISSION EFFICIENCY

(71) Applicant: PANASONIC INTELLECTUAL PROPERTY MANAGEMENT CO., LTD., Osaka (JP)

(72) Inventors: Kenichi Asanuma, Kyoto (JP); Atsushi Yamamoto, Kyoto (JP); Tsutomu Sakata, Osaka (JP); Akio Hidaka, Oita (JP); Toshiaki Kikui, Oita (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 531 days.

(21) Appl. No.: 14/236,429

(22) PCT Filed: May 27, 2013

(86) PCT No.: PCT/JP2013/003337
§ 371 (c)(1),
(2) Date: Jan. 31, 2014

(87) PCT Pub. No.: WO2013/179639
PCT Pub. Date: Dec. 5, 2013

(65) Prior Publication Data
US 2014/0197694 A1    Jul. 17, 2014

(30) Foreign Application Priority Data

May 28, 2012  (JP) .................................. 2012-121109

(51) Int. Cl.
*H01F 27/42*     (2006.01)
*H02J 7/02*      (2016.01)
(Continued)

(52) U.S. Cl.
CPC ............... *H02J 7/025* (2013.01); *H01F 38/14* (2013.01); *H02J 5/005* (2013.01)

(58) Field of Classification Search
CPC ............. H01F 38/14; H02J 5/005; H02J 7/025
(Continued)

(56) References Cited

U.S. PATENT DOCUMENTS 6,176,433 B1    1/2001  Uesaka et al.
8,207,807 B2    6/2012  Kikuchi et al.
(Continued)

FOREIGN PATENT DOCUMENTS

JP    11-32452      2/1999
JP    2003-37949    2/2003
(Continued)

OTHER PUBLICATIONS

International Search Report (ISR) issued Sep. 10, 2013 in International (PCT) Application No. PCT/JP2013/003337.
(Continued)

*Primary Examiner* — Jared Fureman
*Assistant Examiner* — Duc M Pham
(74) *Attorney, Agent, or Firm* — Wenderoth, Lind & Ponack, L.L.P.

(57) ABSTRACT

A contactless connector apparatus is provided with a first coil closely opposed to a second coil so as to be electromagnetically coupled thereto. The first coil includes: an inner transmitter coil wound around an axis passing through its center; and an outer transmitter coil wound around the axis and outside the inner coil. One end of the outer transmitter coil is connected to one end of the inner transmitter coil such that, when a current flows through the transmitter coils, a direction of a loop current generated around the axis by a current flowing through the inner transmitter coil is opposite to that of a loop current generated
(Continued)

around the axis by a current flowing through the outer transmitter coil. A self-inductance of the outer transmitter coil is larger than that of the inner transmitter coil.

13 Claims, 36 Drawing Sheets

(51) Int. Cl.
 *H01F 38/14* (2006.01)
 *H02J 5/00* (2016.01)
(58) Field of Classification Search
 USPC .......................................................... 307/104
 See application file for complete search history.

(56) References Cited

U.S. PATENT DOCUMENTS

| | | | | |
|---|---|---|---|---|
| 2004/0021465 | A1* | 2/2004 | Hollis | G01R 33/421 324/318 |
| 2010/0181845 | A1 | 7/2010 | Fiorello et al. | |
| 2011/0304217 | A1* | 12/2011 | Yamamoto | B60L 11/182 307/104 |
| 2012/0025940 | A1* | 2/2012 | Kikuchi | H01F 27/2871 336/188 |
| 2013/0119779 | A1 | 5/2013 | Jung | |

FOREIGN PATENT DOCUMENTS

| | | |
|---|---|---|
| JP | 2003-37950 | 2/2003 |
| JP | 2009-164293 | 7/2009 |
| JP | 2011-258807 | 12/2011 |
| JP | 2011-259534 | 12/2011 |
| JP | 2012-33740 | 2/2012 |
| JP | 2012-186472 | 9/2012 |
| JP | 2013-106045 | 5/2013 |

OTHER PUBLICATIONS

International Preliminary Report on Patentability and English translation of Written Opinion issued Dec. 11, 2014 in International (PCT) Application No. PCT/JP2013/003337.

* cited by examiner

CONTACTLESS CONNECTOR SYSTEM TOLERANT OF POSITION DISPLACEMENT BETWEEN TRANSMITTER COIL AND RECEIVER COIL AND HAVING HIGH TRANSMISSION EFFICIENCY

TECHNICAL FIELD

The present disclosure relates to a contactless connector apparatus and a contactless connector system that use inductive coupling between coils, and relates to a power transmission apparatus and a power transmission system that include the contactless connector apparatus or the contactless connector system.

BACKGROUND ART

In recent years, contactless connector apparatuses and contactless connector systems using inductive coupling between coils, and power transmission apparatuses and power transmission systems provided with a contactless connector apparatus or a contactless connector system have been being developed for the purpose of wireless charging of mobile electronic equipment or EV equipment, such as mobile phones and electric cars. For example, the inventions of Patent Documents 1 to 3 are known as contactless power transmission systems.

A battery-powered device and a charging cradle of Patent Document 1 include: a charging cradle having a power supply coil connected to an AC power supply; and a battery-powered device to be mounted on the charging cradle and including an induction coil electromagnetically coupled to the power supply coil. A built-in battery of the battery-powered device is charged with power transmitted from the power supply coil to the induction coil. The power supply coil includes a planar inner coil, and a planar outer coil disposed outside the inner coil and on the same plane as the inner coil. The AC power supply to the charging cradle includes a switching circuit for changing between an inner coil active state where AC power is supplied to the inner coil and not supplied to the outer coil, and an inner and outer coil active state where AC power is supplied to both the inner coil and the outer coil. The AC power supply changes between the inner coil active state and the inner and outer coil active state by the battery-powered device mounted on the charging cradle, and transmits power to the induction coil of the battery-powered device. That is, the battery-powered device and the charging cradle of Patent Document 1 are characterized by changing between two active states to achieve optimal power transmission.

A contactless power transmission apparatus of Patent Document 2 is characterized in that the power transmission apparatus transmits power from a primary coil to a secondary coil in a contactless manner through an gap by using electromagnetic induction between a pair of coils opposite to each other, and the power transmission apparatus is provided with a plurality of planar coils at a primary side, and one or more planar coils at a secondary side, and the outer diameter of the secondary coil is smaller than the outer diameter of the primary coils. The contactless power transmission apparatus of Patent Document 2 is characterized by selecting an optimal coil from among the plurality of primary coils to achieve stable power transmission.

A wireless transmission system of Patent Document 3 is provided with a resonator for wireless power transmission, the resonator including a conductor forming one or more loops and having an inductance, and a network of capacitors having a capacitance and a desired electrical parameter and coupled to the conductor. In this case, the network of capacitors includes at least one capacitor of a first type having a first temperature profile as the electrical parameter, and at least one capacitor of a second type having a second temperature profile as the electrical parameter.

The principles of such contactless power transmission systems can also be applied to information transmission systems provided with a contactless connector apparatus, and to induction heating apparatuses such as IH cooking apparatuses.

CITATION LIST

Patent Documents

[Patent Document 1] Japanese Patent Laid-open Publication No. 2011-259534
[Patent Document 2] Japanese Patent Laid-open Publication No. 2009-164293
[Patent Document 3] U.S. Patent Application Publication No. 2010/0181845

SUMMARY OF INVENTION

Technical Problem

In order to achieve high transmission efficiency in a contactless power transmission system, it is necessary to accurately align a transmitter coil included in a power transmitter apparatus (e.g., a charger) and a receiver coil included in a power receiver apparatus (e.g., an apparatus to be charged) to oppose to each other, so that a strong electromagnetic coupling occurs between the transmitter coil and the receiver coil.

According to the invention of Patent Document 1, high transmission efficiency can be achieved when the transmitter coil and the receiver coil are accurately aligned to oppose to each other. However, there is a problem of a degradation in transmission efficiency when a position displacement occurs. In addition, according to the invention of Patent Document 2, the stable transmission efficiency is achieved even when a position displacement occurs. However, there is a problem of an increase in the area of the transmitter coil.

In order to avoid the reduction in transmission efficiency caused by a position displacement, the invention of Patent Document 3 dynamically changes a matching circuit. However, there is a problem that such a solution results in a complicated control.

The same problems are present not only in contactless power transmission systems, but also in information transmission systems and induction heating apparatuses provided with a contactless connector apparatus.

An object of the present disclosure is to solve the above-described problems, and to provide a contactless connector apparatus and a contactless connector system that are tolerant of a position displacement between a transmitter coil and a receiver coil and have high transmission efficiency, with a simple configuration, and to provide a power transmission apparatus and a power transmission system that include such a contactless connector apparatus.

Solution to Problem

According to a contactless connecter apparatus as an aspect of the present disclosure, a contactless connector apparatus is provided with a first coil closely opposed to a second coil so as to be electromagnetically coupled to the second coil. The first coil includes: an inner coil wound around an axis passing through a center of the first coil; and an outer coil wound around the axis and outside the inner coil. One end of the outer coil and one end of the inner coil are connected to each other such that, when a current flows through the first coil, a direction of a loop current generated around the axis by a current flowing through the inner coil is opposite to a direction of a loop current generated around the axis by a current flowing through the outer coil. A self-inductance of the outer coil is larger than a self-inductance of the inner coil.

Advantageous Effects of Invention

According to a contactless connector apparatus, a contactless connector system, a power transmission apparatus, and a power transmission system of the present disclosure, it is possible to achieve stable power transmission with sufficiently high transmission efficiency, with a very simple configuration, even when a position displacement occurs between a transmitter coil and a receiver coil.

DESCRIPTION OF EMBODIMENTS

Embodiments of the present disclosure will be described below with reference to the drawings. Note that like components are denoted by the same reference signs.

First Embodiment

Figure 1:
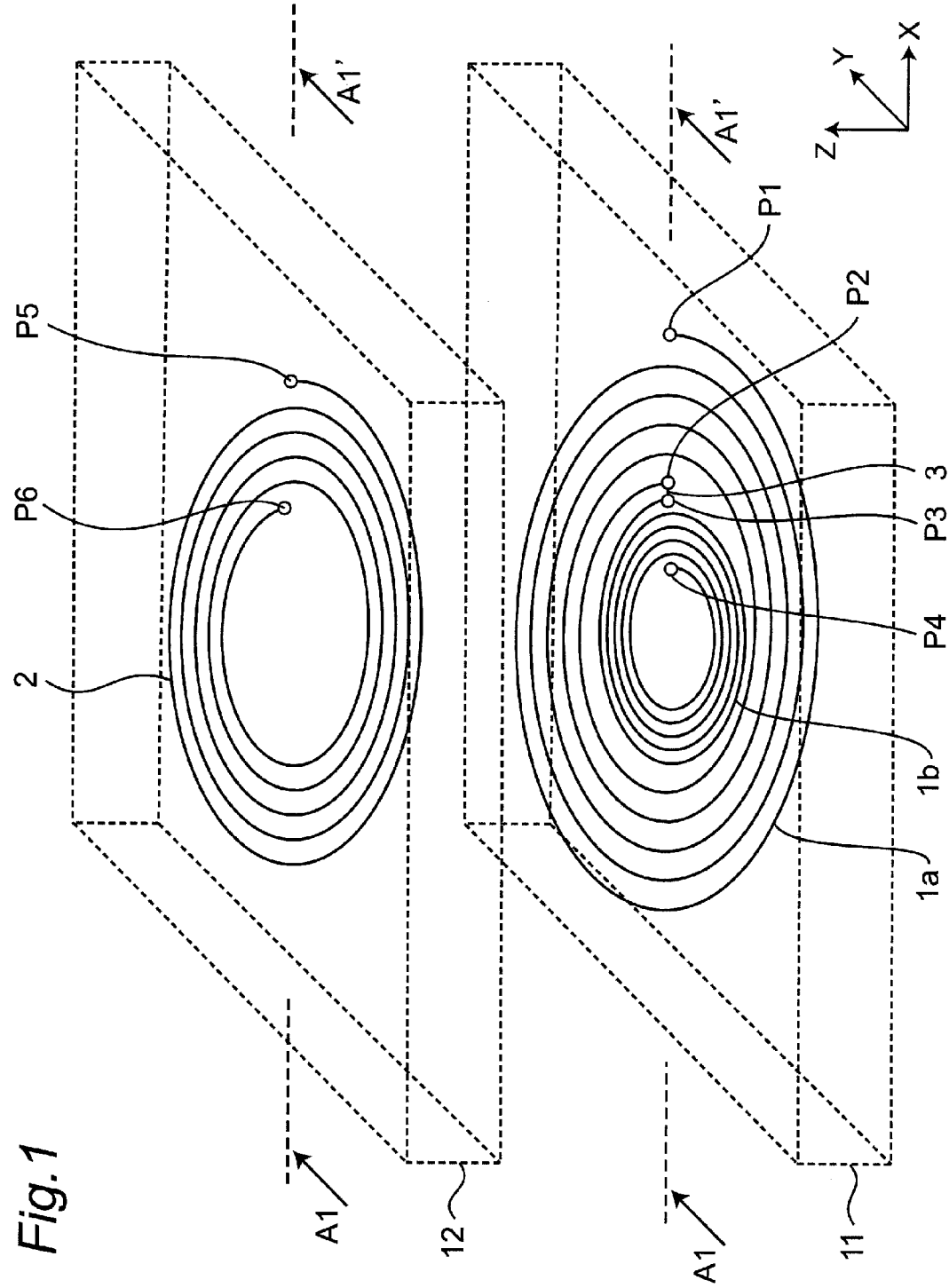
FIG. 1 is a perspective view showing a schematic configuration of a contactless connector system according to a first embodiment.
Figure 2:
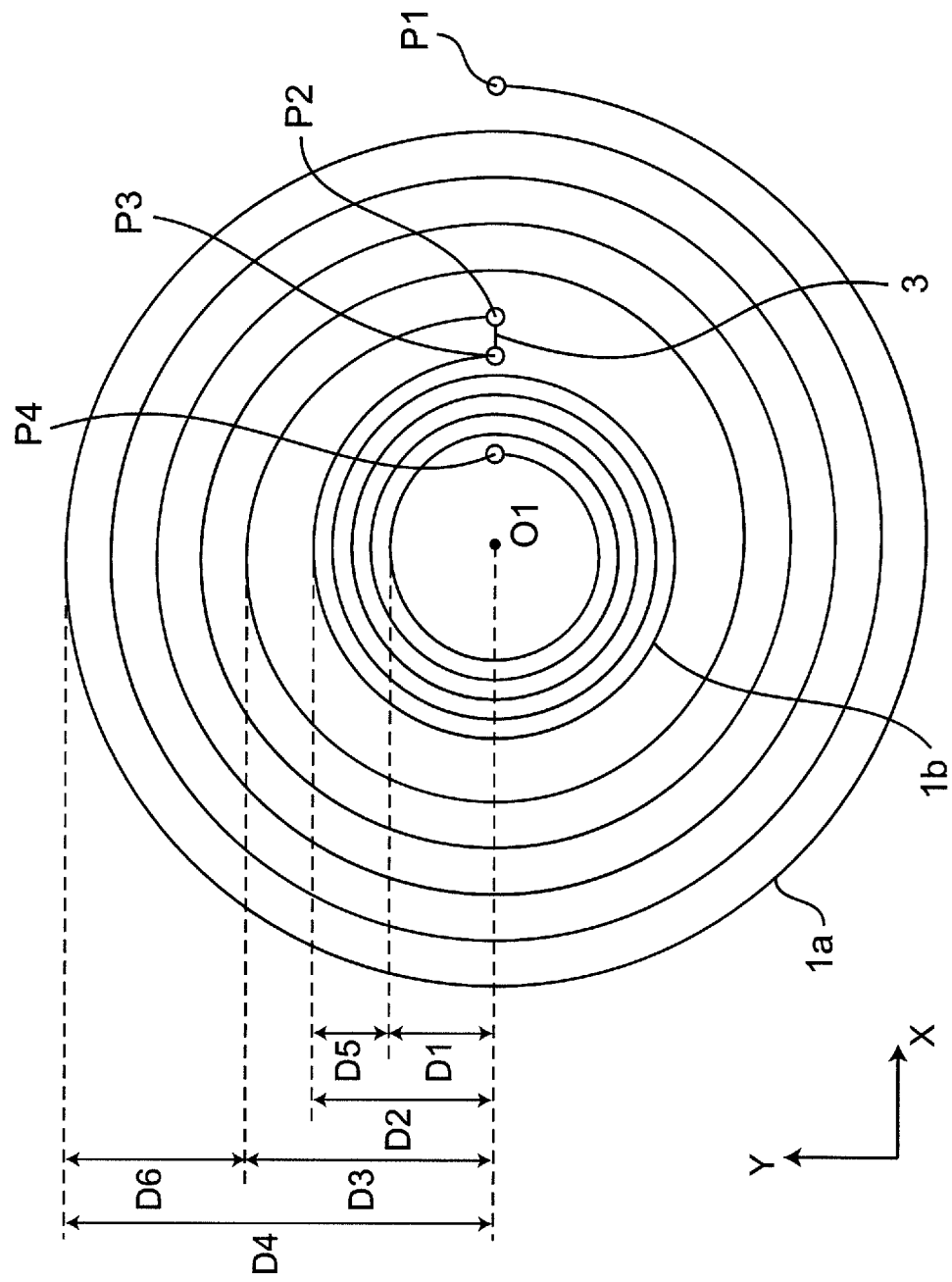
FIG. 2 is a top view showing a schematic configuration of transmitter coils 1a and 1b of FIG. 1.
Figure 3:
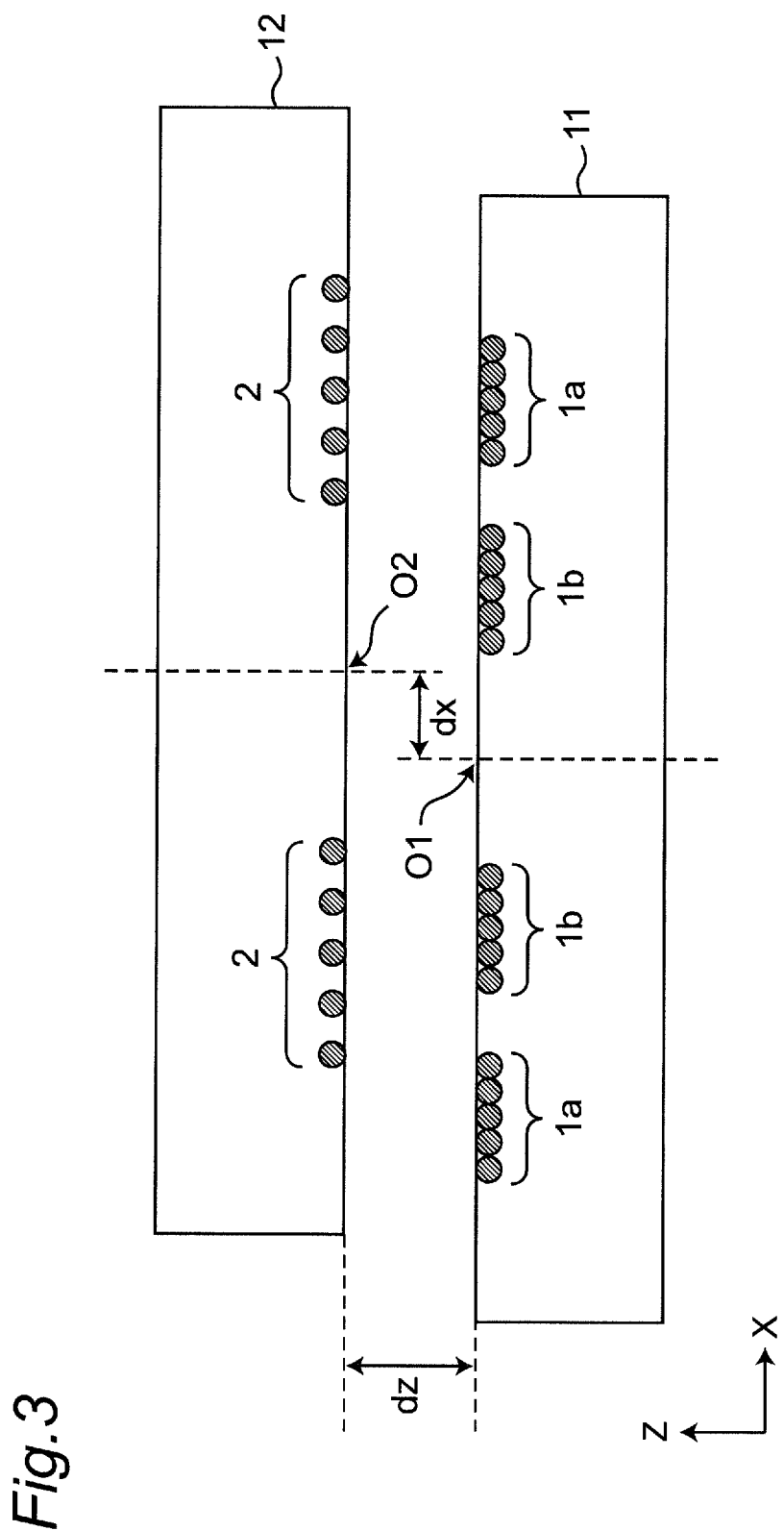
FIG. 3 is a cross-sectional view along line A1-A1 of FIG. 1.

FIG. 1 is a perspective view showing a schematic configuration of a contactless connector system according to a first embodiment. FIG. 2 is a top view showing a schematic configuration of transmitter coils 1a and 1b of FIG. 1. FIG. 3 is a cross-sectional view along line A1-A1' of FIG. 1. The contactless connector system of the present embodiment includes a transmitter contactless connector apparatus including the transmitter coils 1a and 1b; and a receiver contactless connector apparatus including a receiver coil 2. The contactless connector system transmits signals, power, or the like, using electromagnetic coupling between the transmitter coils 1a, 1b and the receiver coil 2.

Referring to FIG. 1, "11" denotes a housing of the transmitter contactless connector apparatus, and "12" denotes a housing of the receiver contactless connector apparatus. In FIG. 1, etc., a power supply, a transmitter circuit, a receiver circuit, etc., which are required to transmit signals or power, are omitted for ease of illustration.

Referring to FIGS. 1 to 3, the transmitter coils 1a and 1b include: an inner transmitter coil 1b wound around an axis passing through a center O1 of the transmitter coils 1a and 1b; and an outer transmitter coil 1a wound around the axis and outside the inner transmitter coil. The receiver coil 2 is wound around an axis passing through a center O2 of the receiver coil 2. For example, the transmitter coils 1a and 1b are provided on a first plane (the top surface of the housing 11 substantially parallel to the XY-plane), and the receiver coil 2 is provided on a second plane (the bottom surface of the housing 12 substantially parallel to the XY-plane) closely opposed to the first plane. The transmitter coils 1a, 1b and the receiver coil 2 are closely opposed to each other, and thus, electromagnetically coupled to each other. The transmitter coils include the outer transmitter coil 1a wound clockwise around the axis passing through the center O1 of the transmitter coils (when viewed from the top in FIG. 1); and the inner transmitter coil 1b wound counterclockwise around the axis (when viewed from the top in FIG. 1) and inside the outer transmitter coil 1a. That is, the direction in which the inner transmitter coil 1b is wound around the axis is opposite to the direction in which the outer transmitter coil 1a is wound around the axis. The outer transmitter coil 1a has terminals P1 and P2 at its both ends, and the inner transmitter coil 1b has terminals P3 and P4 at its both ends. The terminals P2 and P3 are connected to each other by a connecting element 3 such that, when a current flows through the transmitter coils 1a and 1b, the direction of a loop current generated around the axis by the current flowing through the inner transmitter coil 1b is opposite to the direction of a loop current generated around the axis by the current flowing through the outer transmitter coil 1a. In addition, the terminals P1 and P4 are connected to a transmitter circuit (not shown). In addition, the receiver coil 2 is wound clockwise or counterclockwise around the axis passing through the center O2 of the receiver coil 2. The receiver coil 2 has terminals P5 and P6 at its both ends. The terminals P5 and P6 are connected to a receiver circuit (not shown).

The transmitter coils 1a and 1b are configured such that the self-inductance of the outer transmitter coil 1a is larger than the self-inductance of the inner transmitter coil 1b. The ratio of the self-inductance of the inner transmitter coil 1b to the self-inductance of the outer transmitter coil 1a is, for example, greater than 0 and less than 0.45, as will be described with reference to FIGS. 47 and 48.

For example, the transmitter coils 1a and 1b can be configured from, but not limited thereto, the outer transmitter coil 1a with 10 turns, and the inner transmitter coil 1b with 5 turns, the transmitter coils 1a and 1b having radial lengths equal to each other. Both the number of turns and the radial length may affect the characteristics of the transmitter coils 1a and 1b. However, the inventors have found that the radial length is dominant. According to the experiments conducted by the inventors, power transmission of 5 W was achieved through the transmitter coils and the receiver coil with diameters of 3 to 4 cm, by supplying an alternating current of 100 to 200 kHz to the transmitter coils 1a and 1b.

The operating principle of the contactless connector system of the present embodiment will be described below.

A case is considered in which, as shown in FIG. 3, the transmitter coils 1a, 1b and the receiver coil 2 are separated by "dz" in the Z-direction, and the center O1 of the transmitter coils 1a and 1b and the center O2 of the receiver coil 2 are displaced from each other by "dx" in the X-direction.

In general, in a conventional contactless connector system, when a current flows through a transmitter coil, the current generates an electromagnetic field around the transmitter coil, the electromagnetic field induces electromotive force in a receiver coil, and then, an induced current flows through the receiver coil. In other words, the transmitter coil and the receiver coil are electromagnetically coupled to each other. The following coupling coefficient k is used as an index for evaluating the strength of the coupling.

$$k = M/(\sqrt{L1} \times \sqrt{L2})$$

"M" denotes the mutual inductance between the transmitter coil and the receiver coil, "L1" denotes the self-inductance of the transmitter coil, and "L2" denotes the self-inductance of the receiver coil. The coupling coefficient k ranges: 0≤|k|≤1.

Figure 4:
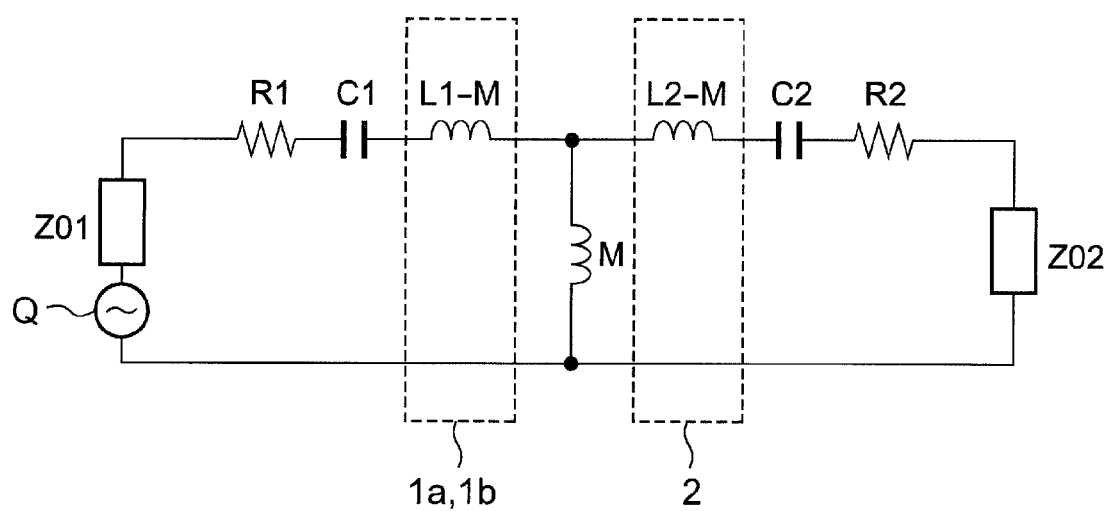
FIG. 4 is a circuit diagram showing an exemplary equivalent circuit of the contactless connector system of FIG. 1.

FIG. 4 is a circuit diagram showing an exemplary equivalent circuit of the contactless connector system of FIG. 1. Q is a signal source, Z01 is the internal impedance of the transmitter circuit, Z02 is the load impedance of the receiver circuit and a load, R1 and R2 are resistance components, and C1 and C2 are matching capacitors. When the contactless connector system operates at an angular frequency ω, a parameter S21 indicative of transmission efficiency can be expressed using the self-inductances L1 and L2 and the mutual inductance M of the transmitter coils 1a, 1b and the receiver coil 2, as follows.

[Mathematical Expression 1]

$$S21 = \frac{j \cdot 2 \cdot \omega \cdot M \cdot \sqrt{\mathrm{Re}[Z01] \cdot \mathrm{Re}[Z02]}}{\left((R1+Z01)+j\cdot\left(\omega\cdot L1-\frac{1}{\omega\cdot C1}\right)\right)\cdot\left((R2+Z02)+j\cdot\left(\omega\cdot L2-\frac{1}{\omega\cdot C2}\right)\right)+(\omega\cdot M)^2}$$

It is noted that the equivalent circuit of FIG. 4 and the equation of the parameter S21 are mere examples, and the equivalent circuit and transmission efficiency of the contactless connector system may be expressed using any other appropriate model. For example, there is substantially no internal impedance Z01 depending on the configuration of the transmitter circuit. The following description of the operating principle also applies to contactless connector systems corresponding to equivalent circuits different than that of FIG. 4.

When the transmitter coils 1a, 1b and the receiver coil 2 are electromagnetically strongly coupled to each other, |k|≈1. As the distance dx or dz increases, the value of |k| decreases. When the transmitter coils 1a, 1b and the receiver coil 2 are not electromagnetically coupled to each other, |k|=0.

Figure 5:
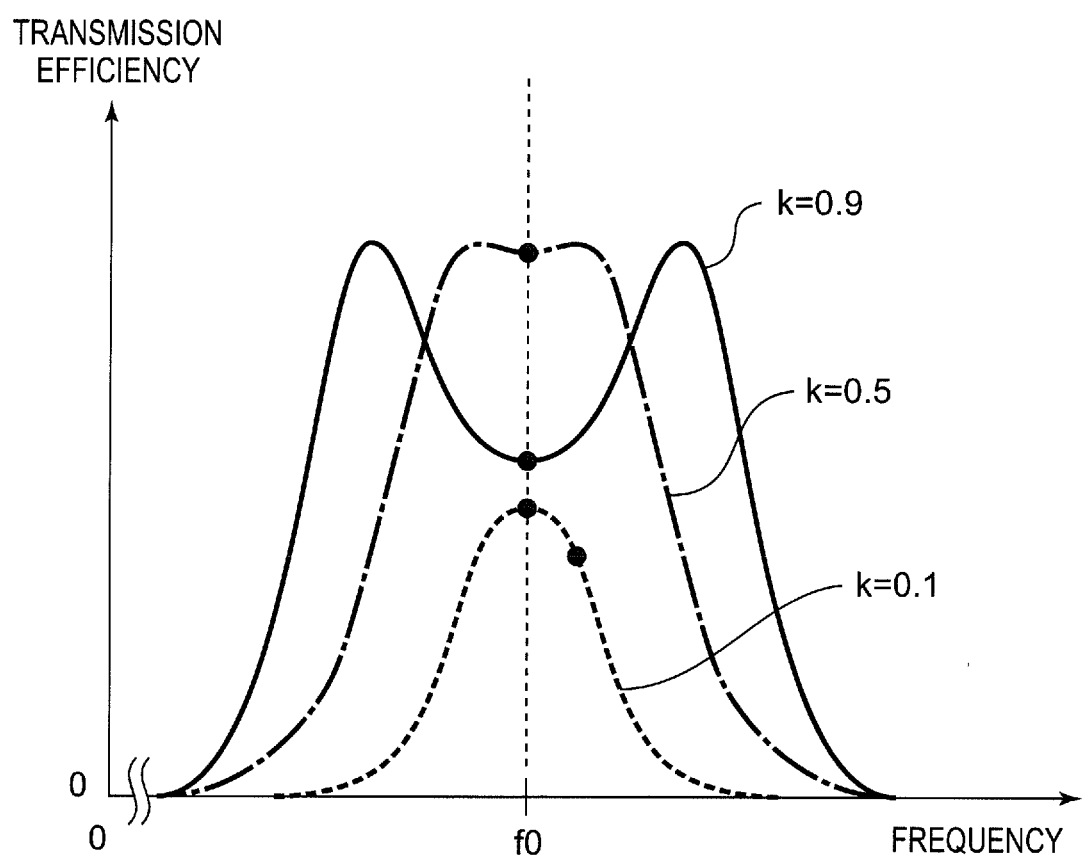
FIG. 5 is a schematic diagram showing the frequency characteristics of transmission efficiency for various coupling coefficients k between the transmitter coils 1a and 1b and a receiver coil 2 of FIG. 1.

FIG. 5 is a schematic diagram showing the frequency characteristics of transmission efficiency for various coupling coefficients k between the transmitter coils 1a, 1b and the receiver coil 2 of FIG. 1. It is assumed that in FIG. 5, the Q factor is constant. According to FIG. 5, it can be seen that the transmission efficiency bandwidth varies depending on the coupling coefficient k. Normally, when the transmitter coils 1a, 1b and the receiver coil 2 are aligned with each other (when the centers O1 and O2 in FIG. 3 coincide with each other), a strong electromagnetic coupling occurs between the transmitter coils 1a, 1b and the receiver coil 2, and the transmission efficiency has two peaks and ranges over narrow bands. Thus, the contactless connector system can not achieve wideband operation. Therefore, in order to achieve wideband operation, it is necessary to decrease the coupling coefficient k, i.e., decrease the mutual inductance M, when the transmitter coils 1 and the receiver coil 2 are close to each other. On the other hand, when the transmitter coils 1a, 1b and the receiver coil 2 are displaced from each other, the electromagnetic coupling between the transmitter coils 1a, 1b and the receiver coil 2 decreases, and the number of peaks of the transmission efficiency changes from two to one. However, as the distance between the transmitter coils 1a, 1b and the receiver coil 2 increases, the transmission efficiency decreases. Therefore, in this case, it is necessary to instead increase the coupling coefficient k, i.e., increase the mutual inductance M. In short, in order to prevent changes in transmission efficiency caused by a position displacement between the transmitter coils 1a, 1b and the receiver coil 2, it is essential to decrease the mutual inductance M when the transmitter coils 1a, 1b and the receiver coil 2 are aligned with each other, and suppress the decrease in the mutual inductance M when they are displaced from each other.

Figure 6:
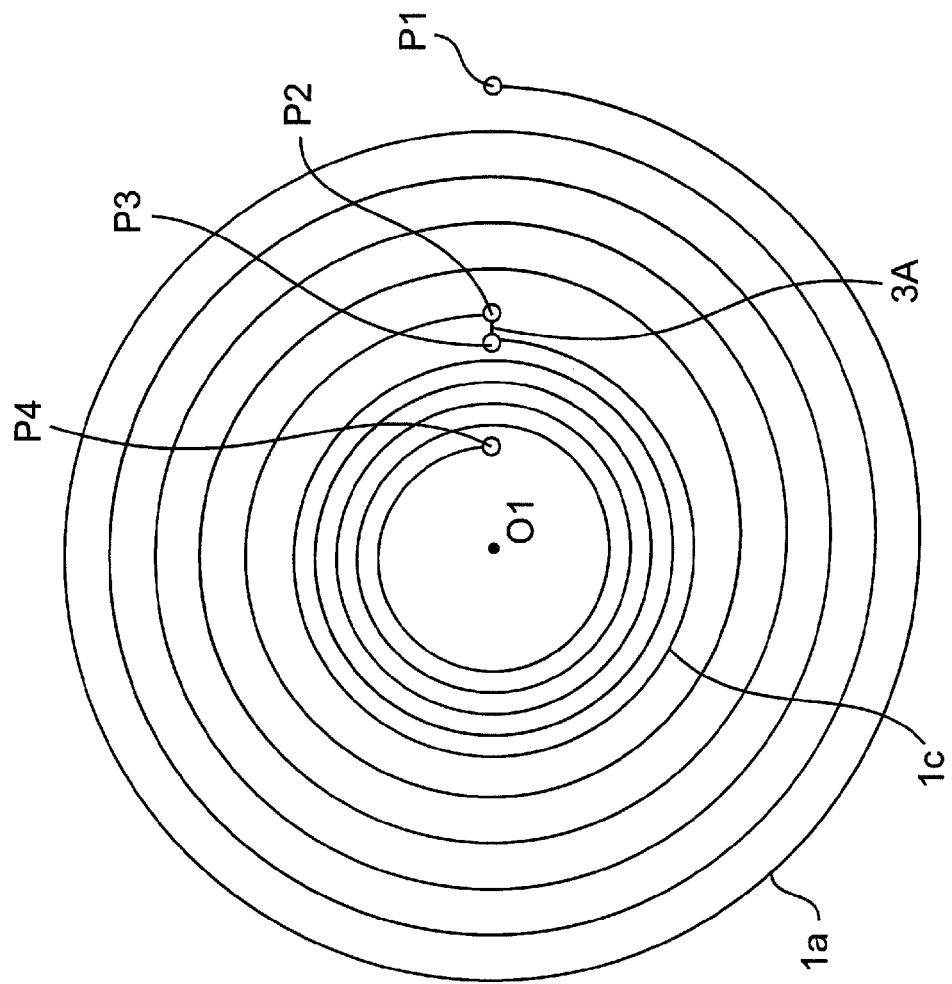
FIG. 6 is a top view showing transmitter coils 1a and 1c of a contactless connector system according to a comparison example of the first embodiment

FIG. 6 is a top view showing transmitter coils 1a and 1c of a contactless connector system according to a comparison example of the first embodiment. The transmitter coils 1a and 1c of FIG. 6 are shown to compare a transmitter coil of a conventional contactless connector system with the contactless connector system of FIG. 1. The contactless connector system of FIG. 1 is provided with the inner transmitter coil 1b wound counterclockwise. On the other hand, the contactless connector system of FIG. 6 is provided with the inner transmitter coil 1c wound clockwise. That is, the direction in which the inner transmitter coil 1c is wound around an axis passing through a center O1 is the same as the direction in which the outer transmitter coil 1a is wound around the axis. Terminals P2 and P3 are connected to each other by a connecting element 3A such that, when a current flows through the transmitter coils 1a and 1c of FIG. 6, the direction of a loop current generated around the axis by the current flowing through the inner transmitter coil 1c is the same as the direction of a loop current generated around the axis by the current flowing through the outer transmitter coil 1a.

Figure 7:
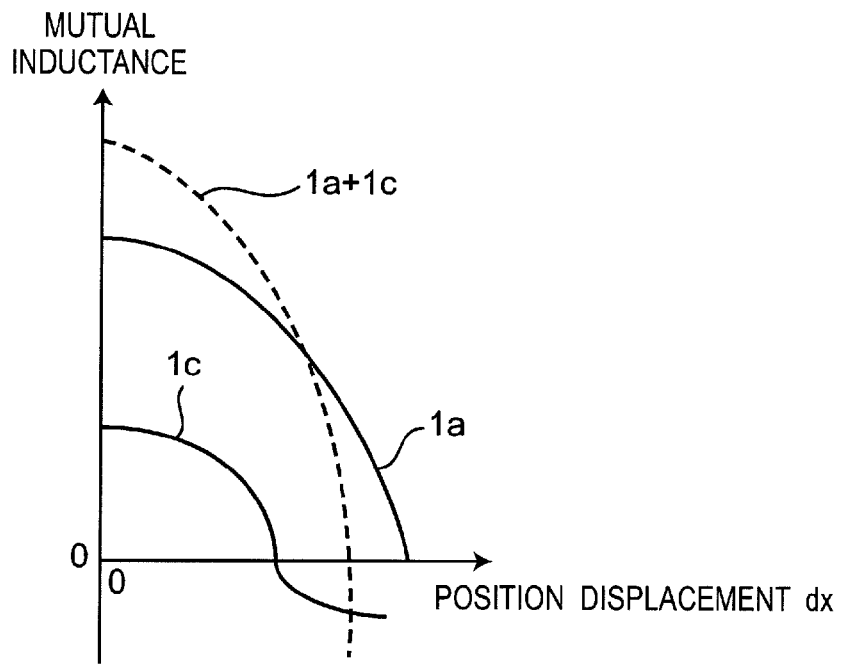
FIG. 7 is a diagram schematically showing changes in mutual inductance with respect to a position displacement dx of the contactless connector system of FIG. 6.

FIG. 7 is a diagram schematically showing changes in mutual inductance with respect to a position displacement dx of the contactless connector system of FIG. 6. The position displacement dx is defined as shown in FIG. 3. Referring to FIG. 7, "1a" indicates the mutual inductance between the outer transmitter coil 1a of FIG. 6 and a receiver coil (not shown) which is the same as the receiver coil 2 of FIG. 1, "1c" indicates the mutual inductance between the inner transmitter coil 1c of FIG. 6 and the receiver coil, and "1a+1c" indicates the mutual inductance between both the transmitter coils 1a, 1c and the receiver coil. The mutual inductance "1c" is large for zero or a small position displacement dx, but decreases as the position displacement dx increases, and becomes negative at a certain position. Therefore, the mutual inductance "1a+1c" varies over a wide range so as to be large for zero or a small position displacement dx, but small for a large position displacement dx.

Figure 8:
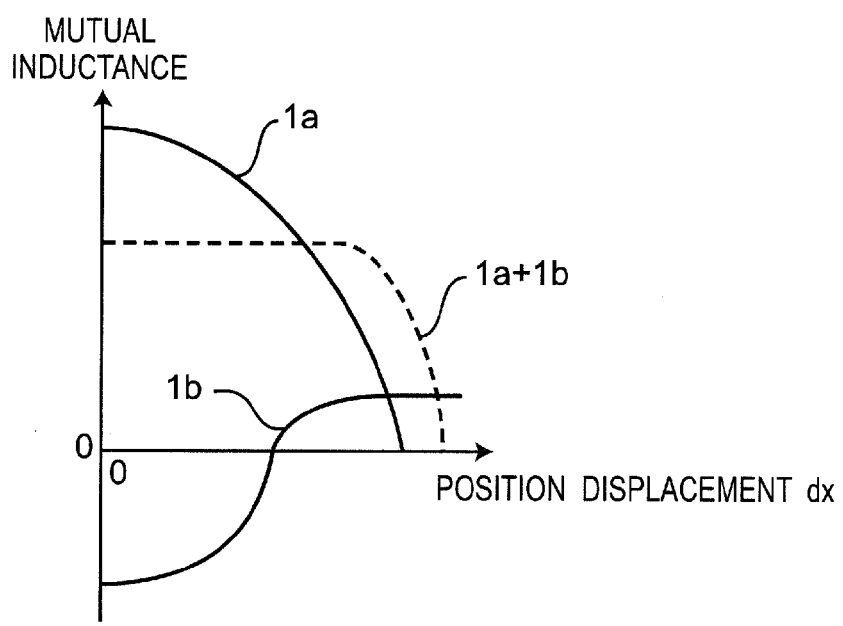
FIG. 8 is a diagram schematically showing changes in mutual inductance with respect to a position displacement dx of the contactless connector system of FIG. 1.

FIG. 8 is a diagram schematically showing changes in mutual inductance with respect to a position displacement dx of the contactless connector system of FIG. 1. Referring to FIG. 8, "1a" indicates the mutual inductance between the outer transmitter coil 1a and the receiver coil 2, "1b" indicates the mutual inductance between the inner transmitter coil 1b and the receiver coil 2, and "1a+1b" indicates the mutual inductance between both the transmitter coils 1a, 1b and the receiver coil 2. As described above, the transmitter coils 1a and 1b are configured such that, when a current flows through the transmitter coils 1a and 1b, the direction of a loop current generated around the axis passing through the center O1 by the current flowing through the inner transmitter coil 1b is opposite to the direction of a loop current generated around the axis by the current flowing through the outer transmitter coil 1a. The contactless connector system of the present embodiment is further configured such that the mutual inductance between the inner transmitter coil 1b and the receiver coil 2 is negative for zero and a small position displacement dx, and the mutual inductance between the inner transmitter coil 1b and the receiver coil 2 is positive for a position displacement dx larger than a predetermined value. By doing so, there is an effect of decreasing the mutual inductance between both the transmitter coils 1a, 1b and the receiver coil 2 for zero and a small position displacement dx, to decrease electromagnetic coupling. In addition, as compared to the case of the conventional contactless connector system (FIG. 7), there is an effect of suppressing a decrease in the mutual inductance between both the transmitter coils 1a, 1b and the receiver coil 2 for a large position displacement dx. As a result, it is possible to achieve stable power transmission with sufficiently high transmission efficiency, regardless of the positional relationship between the transmitter coils 1a, 1b and the receiver coil 2. Further, it is conventionally necessary to increase transmission power in order to deal with a reduction in transmission efficiency, thus resulting in increased heat generation. On the other hand, the transmission efficiency does not decrease in the contactless connector system of the present embodiment, and thus, there is an effect of preventing heat generation.

The coupling coefficient k will be further described with reference to FIG. 5. As described above, the transmission efficiency has two peaks and ranges over narrow bands when a strong electromagnetic coupling occurs between the transmitter coils 1a, 1b and the receiver coil 2. However, when gradually decreasing the coupling coefficient k, the frequency interval between two peaks of the transmission efficiency gradually decreases, and the local minimum of the transmission efficiency between the two peaks gradually increases. A power transmission system has its maximum bandwidth, when the frequency interval becomes substantially 0, in other words, when the difference between the two peaks and the local minimum therebetween of the transmission efficiency is small (e.g., 5 to 10%). A value of the coupling coefficient k is determined so as to satisfy this condition. The parameters of the power transmission system (the numbers of turns, radial lengths, etc., of the transmitter coils 1a, 1b and the receiver coil 2) are determined so as to obtain the determined value of the coupling coefficient k.

Since the contactless connector system of the present embodiment is configured as described above, it is possible to achieve stable power transmission with sufficiently high transmission efficiency, with a very simple configuration, even when a position displacement occurs between the transmitter coils and the receiver coil.

Figure 9:
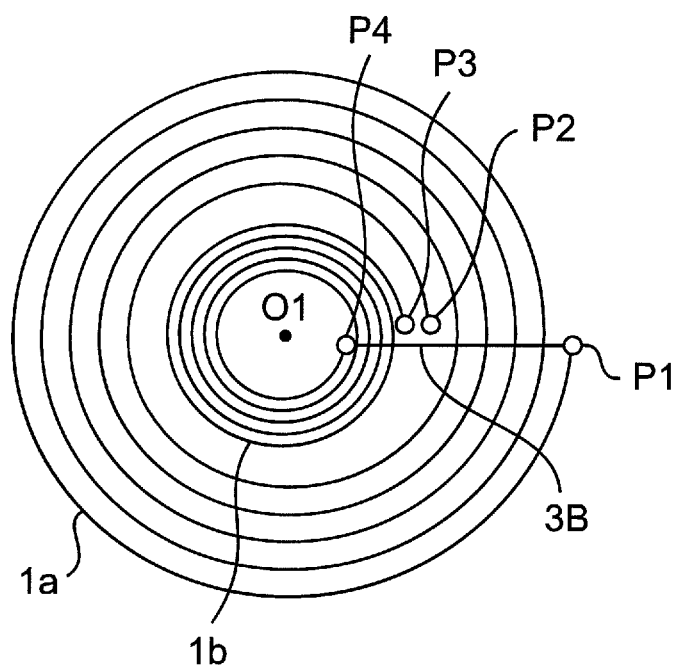
FIG. 9 is a top view showing a schematic configuration of transmitter coils of a contactless connector system according to a first modified embodiment of the first embodiment.

FIG. 9 is a top view showing a schematic configuration of transmitter coils of a contactless connector system according to a first modified embodiment of the first embodiment. An outer transmitter coil 1a and an inner transmitter coil 1b may be connected to each other in a different manner from that of FIG. 1, provided that, when a current flows through the transmitter coils 1a and 1b, the direction of a loop current generated around an axis passing through a center O1 by the current flowing through the inner transmitter coil 1b is opposite to the direction of a loop current generated around the axis by the current flowing through the outer transmitter coil 1a. Referring to FIG. 9, terminals P1 and P4 are connected to each other by a connecting element 3B. In addition, terminals P2 and P3 are connected to a transmitter circuit (not shown).

Figure 10:
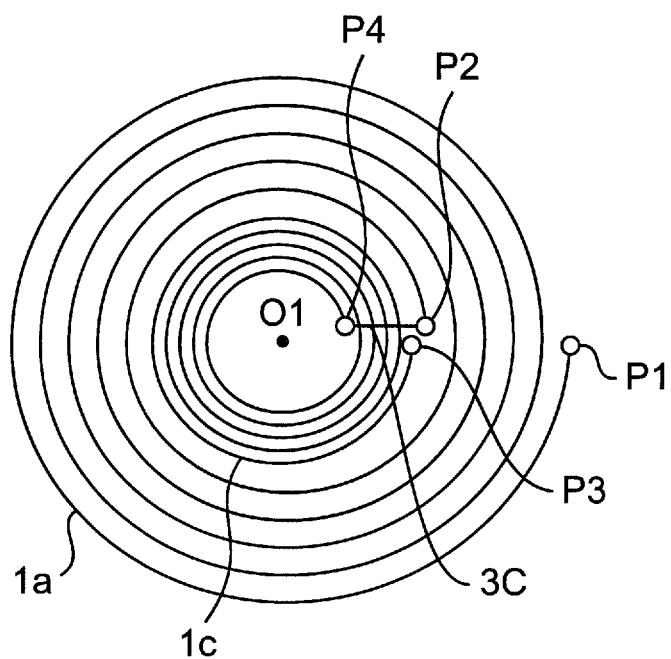
FIG. 10 is a top view showing a schematic configuration of transmitter coils of a contactless connector system according to a second modified embodiment of the first embodiment.
Figure 11:
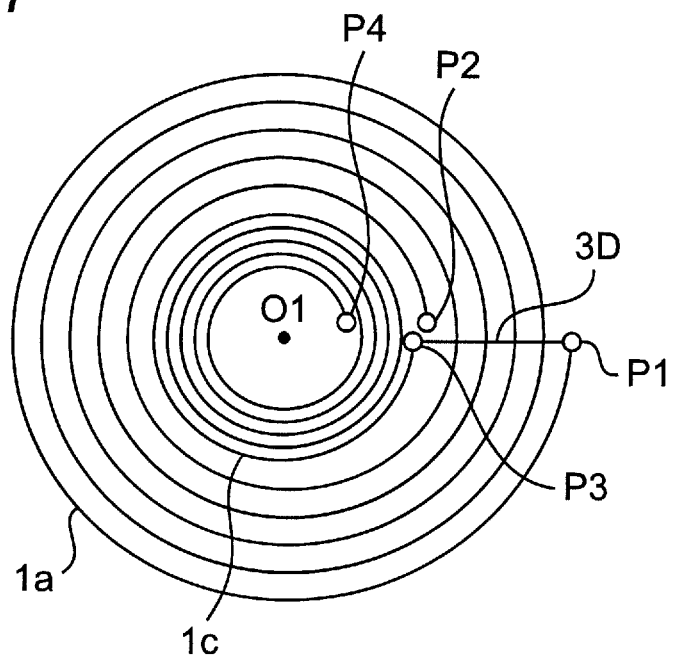
FIG. 11 is a top view showing a schematic configuration of transmitter coils of a contactless connector system according to a third modified embodiment of the first embodiment.

FIG. 10 is a top view showing a schematic configuration of transmitter coils of a contactless connector system according to a second modified embodiment of the first embodiment. FIG. 11 is a top view showing a schematic configuration of transmitter coils of a contactless connector system according to a third modified embodiment of the first embodiment. Each of the contactless connector systems of FIGS. 10 and 11 is provided with an inner transmitter coil 1c wound clockwise in a manner similar to that of the contactless connector system of FIG. 6. In the case of FIG. 10, terminals P2 and P4 are connected to each other by a connecting element 3C such that, when a current flows through transmitter coils 1a and 1c, the direction of a loop current generated around an axis passing through a center O1 by the current flowing through the inner transmitter coil 1c is opposite to the direction of a loop current generated around the axis by the current flowing through the outer transmitter coil 1a. In this case, terminals P1 and P3 are connected to a transmitter circuit (not shown). In the case of FIG. 11, similarly, terminals P1 and P3 are connected to each other by a connecting element 3D, and terminals P2 and P4 are connected to a transmitter circuit (not shown).

In a manner similar to that of the contactless connector system of FIG. 1, the contactless connector systems of FIGS. 9 to 11 can also achieve stable power transmission with sufficiently high transmission efficiency, with a very simple configuration, even when a position displacement occurs between the transmitter coils and the receiver coil.

Figure 12:
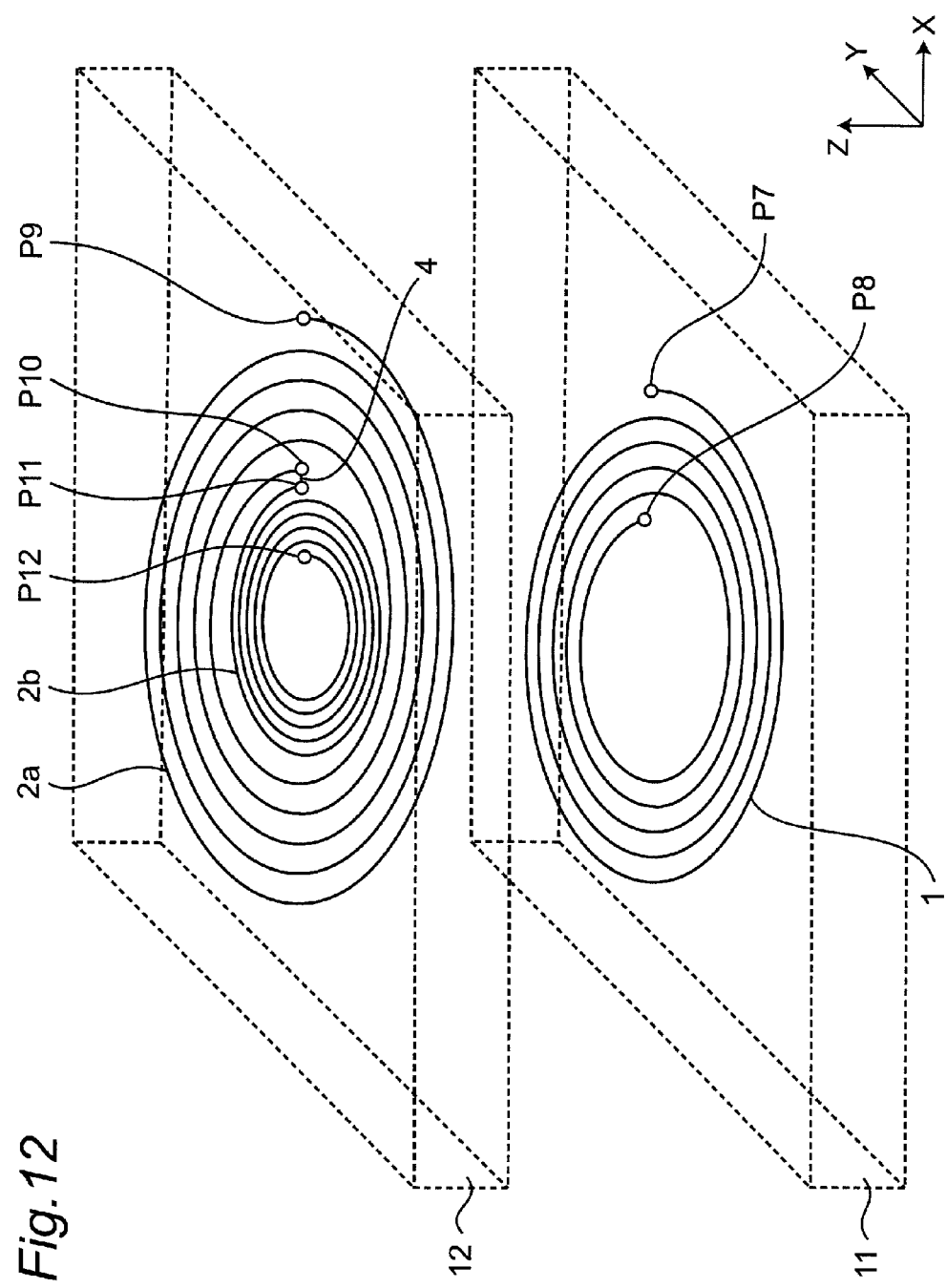
FIG. 12 is a perspective view showing a schematic configuration of a contactless connector system according to a fourth modified embodiment of the first embodiment.

FIG. 12 is a perspective view showing a schematic configuration of a contactless connector system according to a fourth modified embodiment of the first embodiment. The contactless connector system of the present modified embodiment includes: a transmitter contactless connector apparatus including a transmitter coil 1; and a receiver contactless connector apparatus including receiver coils 2a and 2b. In the contactless connector system of the present modified embodiment, the receiver coils 2a and 2b are configured such that, when a current flows through the receiver coils 2a and 2b instead of through the transmitter coil 1, the direction of a loop current generated around an axis passing through the center of the inner receiver coil 2b by the current flowing through the inner receiver coil 2b is opposite to the direction of a loop current generated around the axis by the current flowing through the outer receiver coil 2a.

Referring to FIG. 12, the transmitter coil 1 is wound around an axis passing through a center of the transmitter coil 1. The receiver coils 2 include the inner receiver coil 2b wound around the axis passing through a center of the receiver coils 2; and the outer receiver coil 2a wound around the axis and outside the inner receiver coil. For example, the transmitter coil 1 is provided on a first plane (the top surface of a housing 11 substantially parallel to the XY-plane), and the receiver coils 2a and 2b are provided on a second plane (the bottom surface of a housing 12 substantially parallel to the XY-plane) closely opposed to the first plane. The transmitter coil 1 and the receiver coils 2a, 2b are closely opposed to each other, and thus, electromagnetically coupled to each other. The transmitter coil 1 is wound clockwise or counterclockwise around the axis passing through the center of the transmitter coil 1. The transmitter coil 1 has terminals P7 and P8 at its both ends. The terminals P7 and P8 are connected to a transmitter circuit (not shown). In addition, the receiver coils include the outer receiver coil 2a wound clockwise around the axis passing through the center of the receiver coils 2; and the inner receiver coil 2b wound counterclockwise around the axis and inside the outer receiver coil 2a. The outer receiver coil 2a has terminals P9 and P10 at its both ends, and the inner receiver coil 2b has terminals P11 and P12 at its both ends. The terminals P10 and P11 are connected to each other by a connecting element 4 such that, when a current flows through the receiver coils 2a and 2b, the direction of a loop current generated around the axis passing through the center of the inner receiver coil 2b by the current flowing through the inner receiver coil 2b is opposite to the direction of a loop current generated around the axis by the current flowing through the outer receiver coil 2a. In addition, the terminals P9 and P12 are connected to a receiver circuit (not shown).

Figure 13:
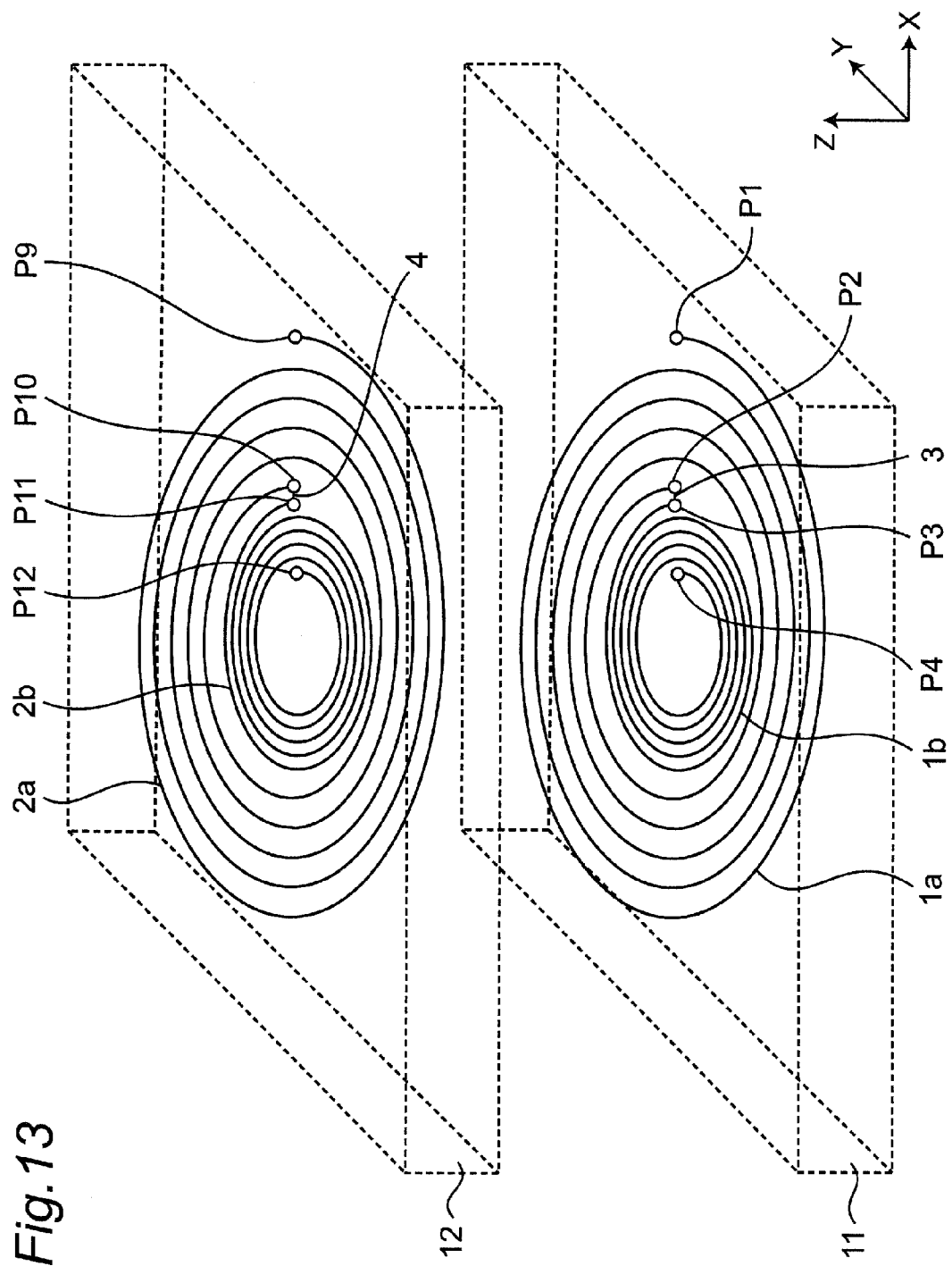
FIG. 13 is a perspective view showing a schematic configuration of a contactless connector system according to a fifth modified embodiment of the first embodiment.

FIG. 13 is a perspective view showing a schematic configuration of a contactless connector system according to a fifth modified embodiment of the first embodiment. As shown in FIG. 13, the transmitter contactless connector apparatus of FIG. 1 may be combined with the receiver contactless connector apparatus of FIG. 12.

In a manner similar to that of the contactless connector system of FIG. 1, the contactless connector systems of FIGS. 12 and 13 can also achieve stable power transmission with sufficiently high transmission efficiency, with a very simple configuration, even when a position displacement occurs between the transmitter coils and the receiver coils.

Second Embodiment

Figure 14:
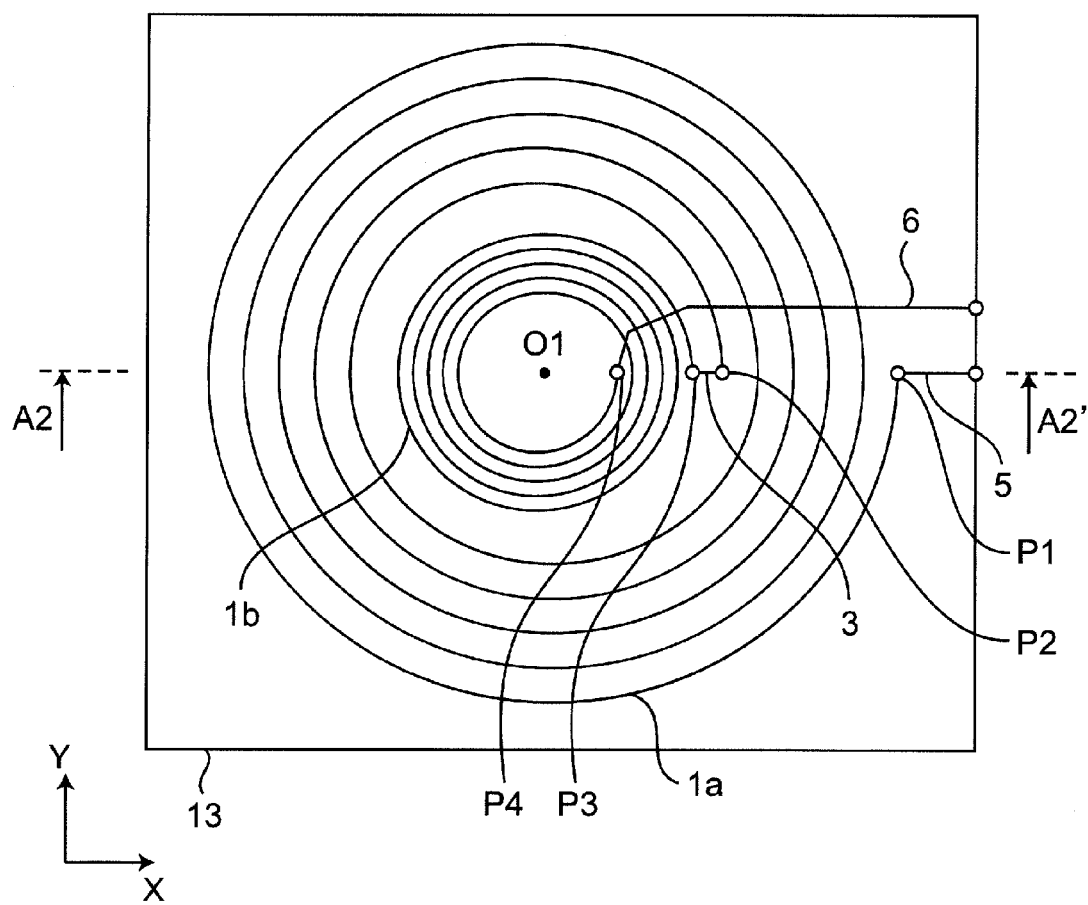
FIG. 14 is a top view showing a schematic configuration of a transmitter contactless connector apparatus according to a second embodiment.
Figure 15:
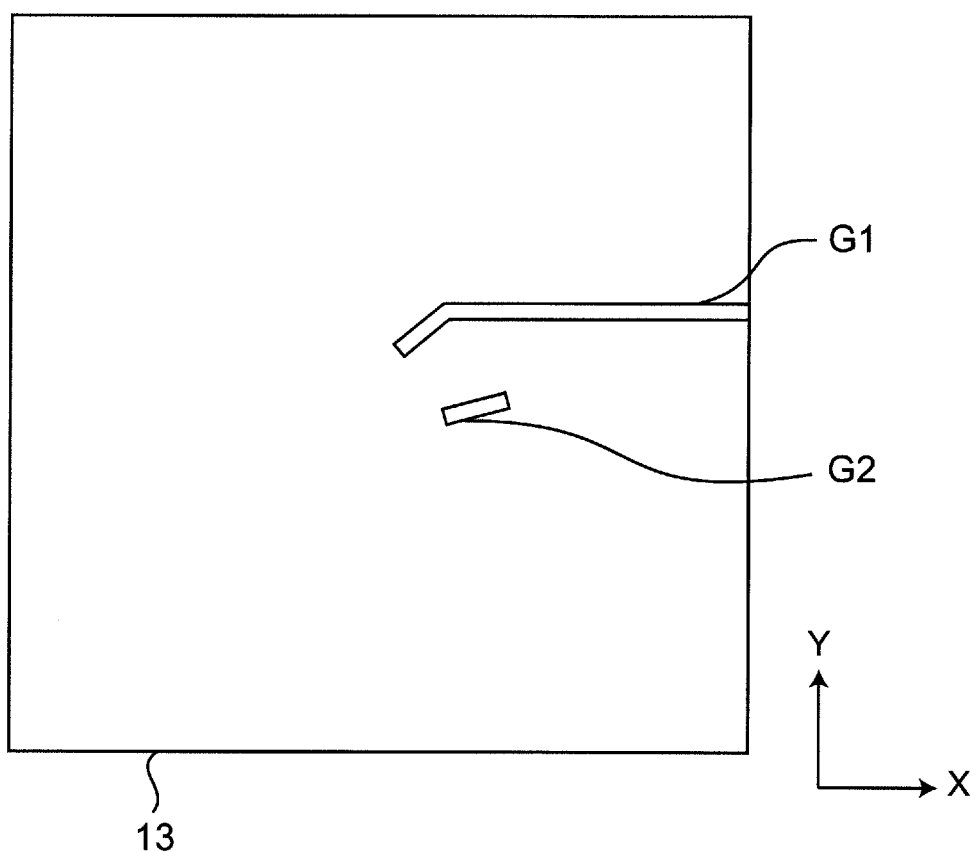
FIG. 15 is a top view showing a magnetic substrate 13 of FIG. 14.
Figure 16:
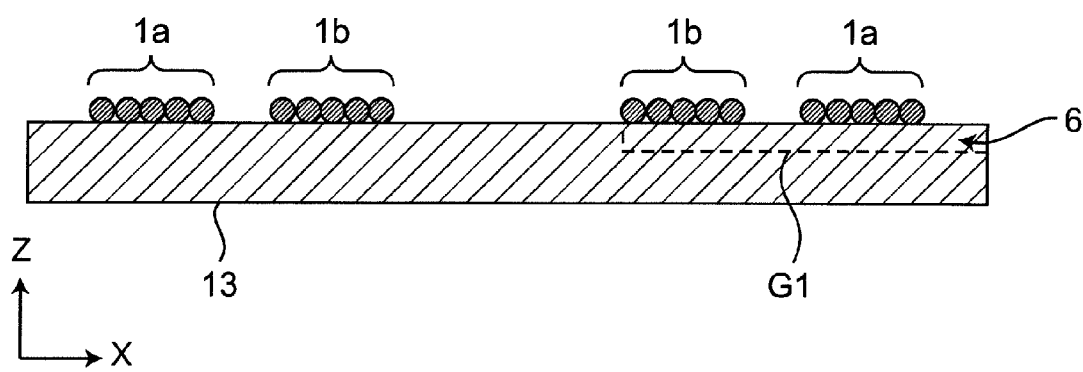
FIG. 16 is a cross-sectional view along line A2-A2' of FIG. 14.
Figure 31:
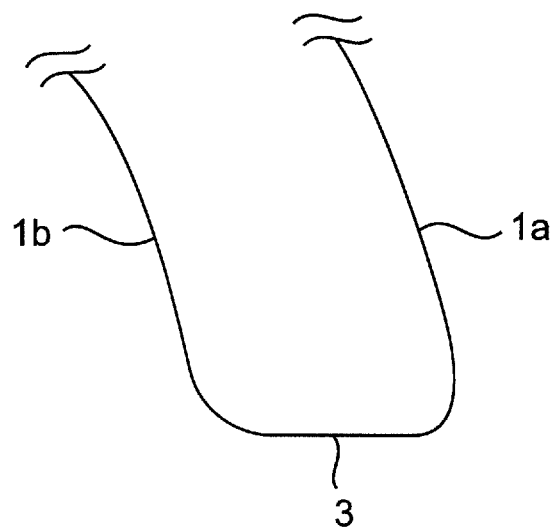
FIG. 31 is a diagram showing a part of a transmitter coil of a contactless connector system according to a fifth embodiment.

FIG. 14 is a top view showing a schematic configuration of a transmitter contactless connector apparatus according to a second embodiment. FIG. 15 is a top view showing a magnetic substrate 13 of FIG. 14. FIG. 16 is a cross-sectional view along line A2-A2' of FIG. 14. The transmitter contactless connector apparatus is provided with: conducting wires 5 and 6 connected to terminals P1 and P4, respectively; and a magnetic substrate 13 provided on one side with respect to transmitter coils 1a and 1b, the one side being opposite to a side where a receiver coil is provided close to the transmitter coils 1a and 1b. The conducting wires 5 and 6 are connected to a transmitter circuit (not shown). The magnetic substrate 13 is, for example, ferrite, and serves as a shield for the transmitter circuit. As shown in FIG. 15, the magnetic substrate 13 may further have grooves G1 and G2 into which at least a part of the transmitter coils 1a and 1b and the conducting wires 5 and 6 is inserted. In the case shown in FIGS. 14 to 16, since the conducting wire 6 is routed under the transmitter coils 1a and 1b, the conducting wire 6 is inserted into the groove G1. Normally, the thickness of the transmitter coils increases due to the conducting wire 6 extending from the inner transmitter coil 1b to a portion external to the outer transmitter coil 1a. However, by inserting the conducting wire 6 into the groove G1, there is an effect of removing unnecessary protrusions from the contactless connector apparatus. In addition, when an outer transmitter coil 1a and an inner transmitter coil 1b are configured by folding a single conducting wire as shown in FIG. 31, the thickness of the transmitter coils increases at the fold of the conducting wire. However, in this case, by inserting the fold of the conducting wire into the groove G2, there is an effect of removing unnecessary protrusions from the contactless connector apparatus.

The groove G2 for the fold of the conducting wire may be provided as necessary.

Third Embodiment

Figure 17:
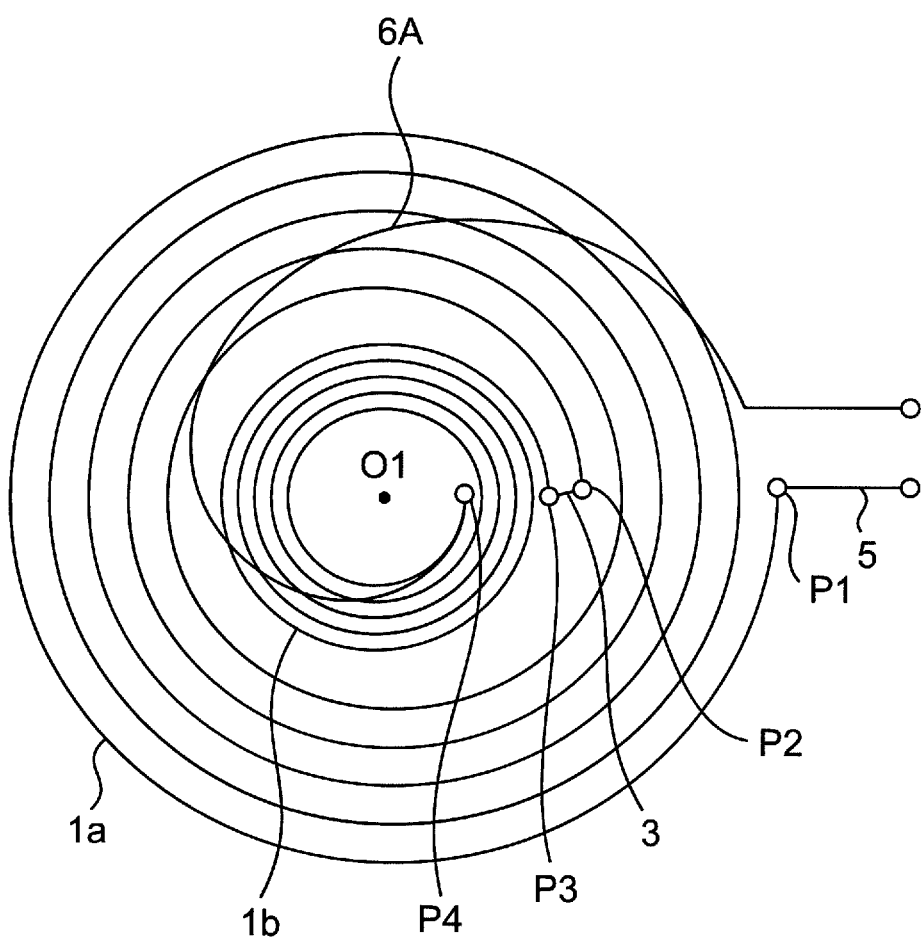
FIG. 17 is a top view showing a schematic configuration of a transmitter contactless connector apparatus according to a third embodiment.

FIG. 17 is a top view showing a schematic configuration of a transmitter contactless connector apparatus according to a third embodiment. The transmitter contactless connector apparatus is provided with conducting wires 5 and 6A connected to terminals P1 and P4, respectively. The terminal P4 is close to an axis passing through a center O1, and the terminal P1 is remote from the axis. The conducting wire 6A connected to the terminal P4 of an inner transmitter coil 1b is wound clockwise around the axis so as to gradually increase a distance from the axis. When the magnetic substrate 13 of FIG. 14 is very thin not enough to provide a groove G1 into which a conducting wire 6 is completely inserted, the conducting wire 6A wound in the manner as shown in FIG. 17 may be used. Thus, it is possible to remove unnecessary protrusions from the contactless connector apparatus. In addition, there is an effect of further improving tolerance to a position displacement by virtue of the mutual inductance between the wound conducting wire 6A and a receiver coil. When the conducting wire 6A has an insulating cover, the conducting wire 6A may be in contact with the inner transmitter coil 1b and an outer transmitter coil 1a.

Figure 18:
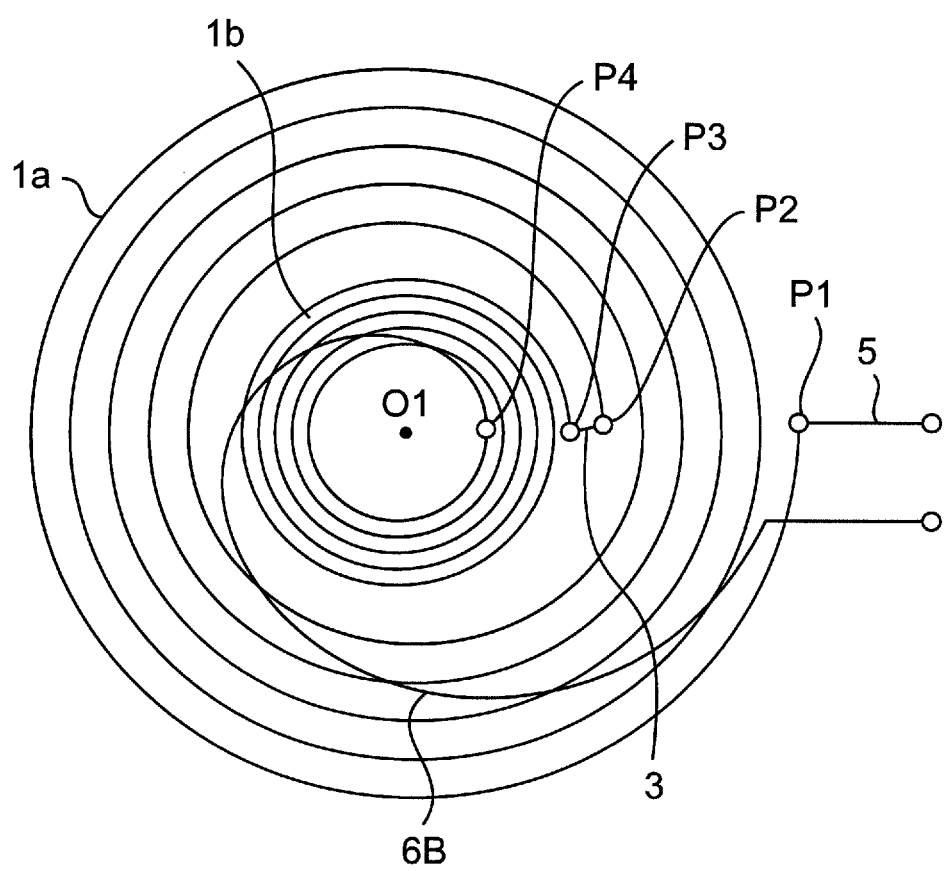
FIG. 18 is a top view showing a schematic configuration of a transmitter contactless connector apparatus according to a modified embodiment of the third embodiment.

FIG. 18 is a top view showing a schematic configuration of a transmitter contactless connector apparatus according to a modified embodiment of the third embodiment. The transmitter contactless connector apparatus is provided with conducting wires 5 and 6B connected to terminals P1 and P4, respectively. The conducting wire 6B connected to the terminal P4 of an inner transmitter coil 1b is wound counterclockwise around an axis passing through a center O1, so as to gradually increases a distance from the axis. The contactless connector apparatus of FIG. 18 also has the same effects as those obtained by the contactless connector apparatus of FIG. 17. When the conducting wire 6B has an insulating cover, the conducting wire 6B may be in contact with the inner transmitter coil 1b and an outer transmitter coil 1a.

Fourth Embodiment

Figure 19:
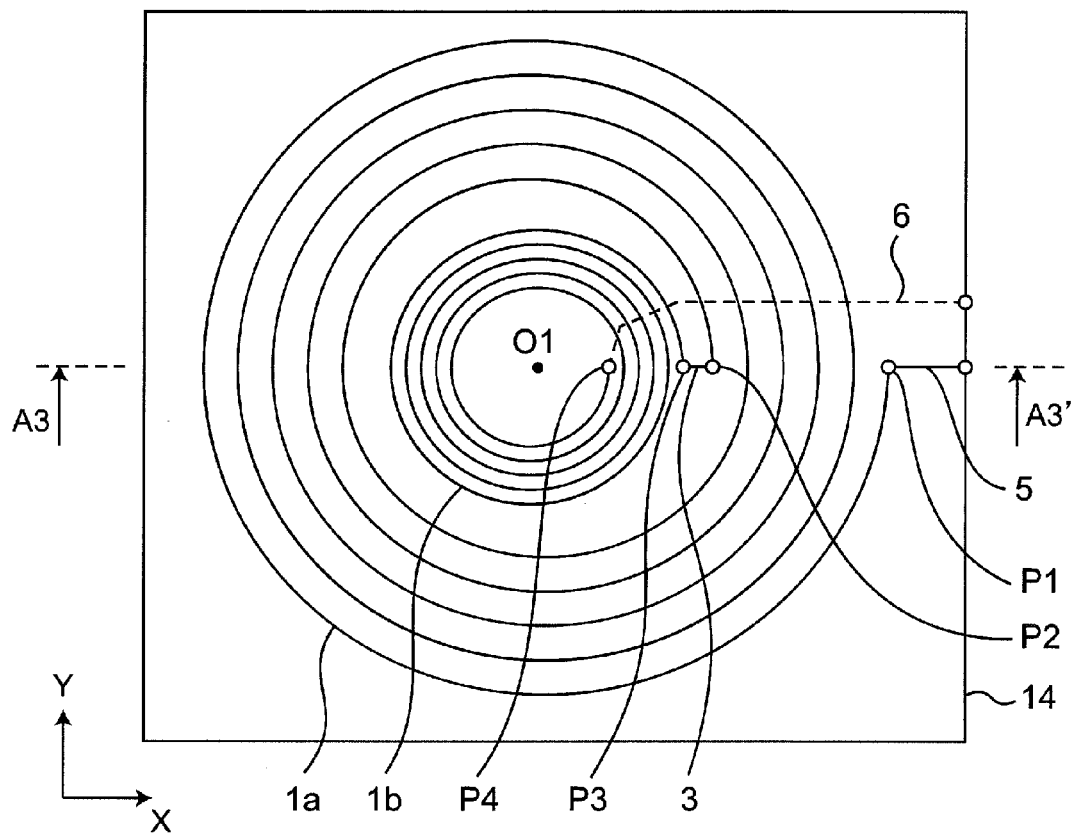
FIG. 19 is a top view showing a schematic configuration of a transmitter contactless connector apparatus according to a fourth embodiment.
Figure 20:
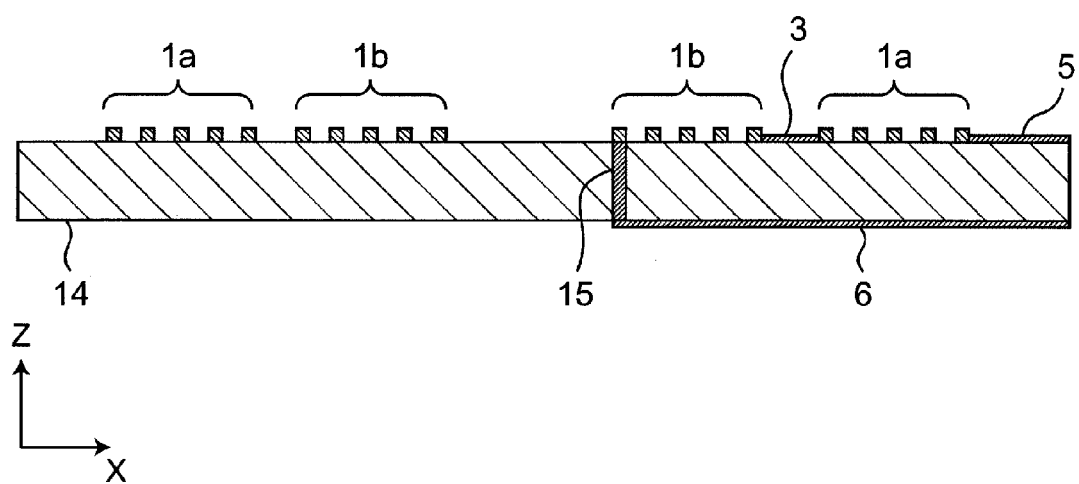
FIG. 20 is a cross-sectional view along line A3-A3' of FIG. 19.

FIG. 19 is a top view showing a schematic configuration of a transmitter contactless connector apparatus according to a fourth embodiment. FIG. 20 is a cross-sectional view along line A3-A3' of FIG. 19. Transmitter coils 1a and 1b of FIG. 19 are the same as the transmitter coils 1a and 1b of FIG. 1. Each of the outer transmitter coil 1a and the inner transmitter coil 1b may be formed (patterned) on at least one surface of a dielectric substrate 14 of a printed circuit board using a circuit patterning method. Referring to FIG. 19, the outer transmitter coil 1a, the inner transmitter coil 1b, and a connecting element 3 are patterned on the top surface of the dielectric substrate 14. The contactless connector apparatus is provided with conducting wires 5 and 6 connected to terminals P1 and P4, respectively. The conducting wire 5 is patterned on the top surface of the dielectric substrate 14. The conducting wire 6 is provided with: a conductor patterned on the bottom surface of the dielectric substrate 14; and a via conductor 15 going through the dielectric substrate 14.

Figure 21:
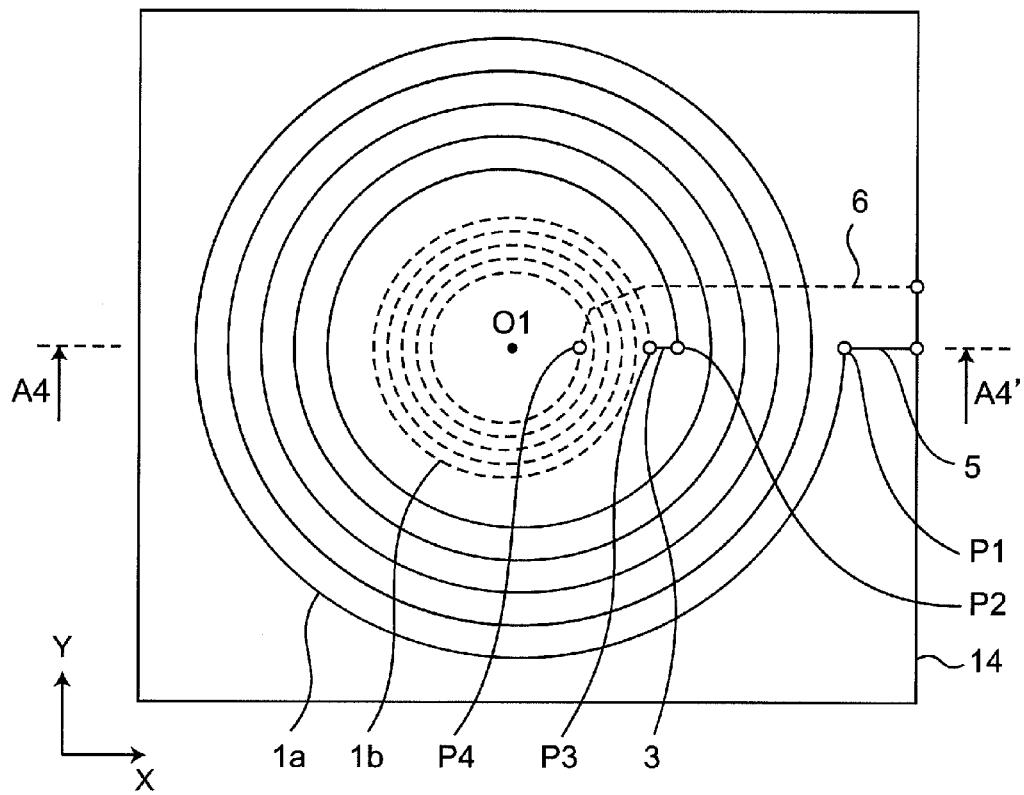
FIG. 21 is a top view showing a schematic configuration of a transmitter contactless connector apparatus according to a first modified embodiment of the fourth embodiment.
Figure 22:
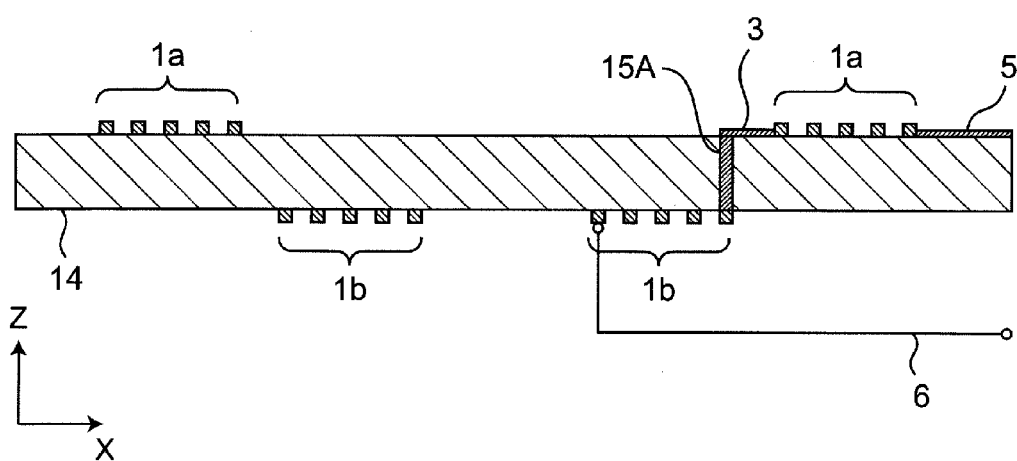
FIG. 22 is a cross-sectional view along line A4-A4' of FIG. 21.

FIG. 21 is a top view showing a schematic configuration of a transmitter contactless connector apparatus according to a first modified embodiment of the fourth embodiment. FIG. 22 is a cross-sectional view along line A4-A4' of FIG. 21. Referring to FIG. 21, an outer transmitter coil 1a and a connecting element 3 are patterned on the top surface of a dielectric substrate 14, and an inner transmitter coil 1b is patterned on the bottom surface of the dielectric substrate 14. A conducting wire 5 is patterned on the top surface of the dielectric substrate 14. The contactless connector apparatus is further provided with a via conductor 15A going through the dielectric substrate 14 to connect the connecting element 3 to the inner transmitter coil 1b.

Figure 23:
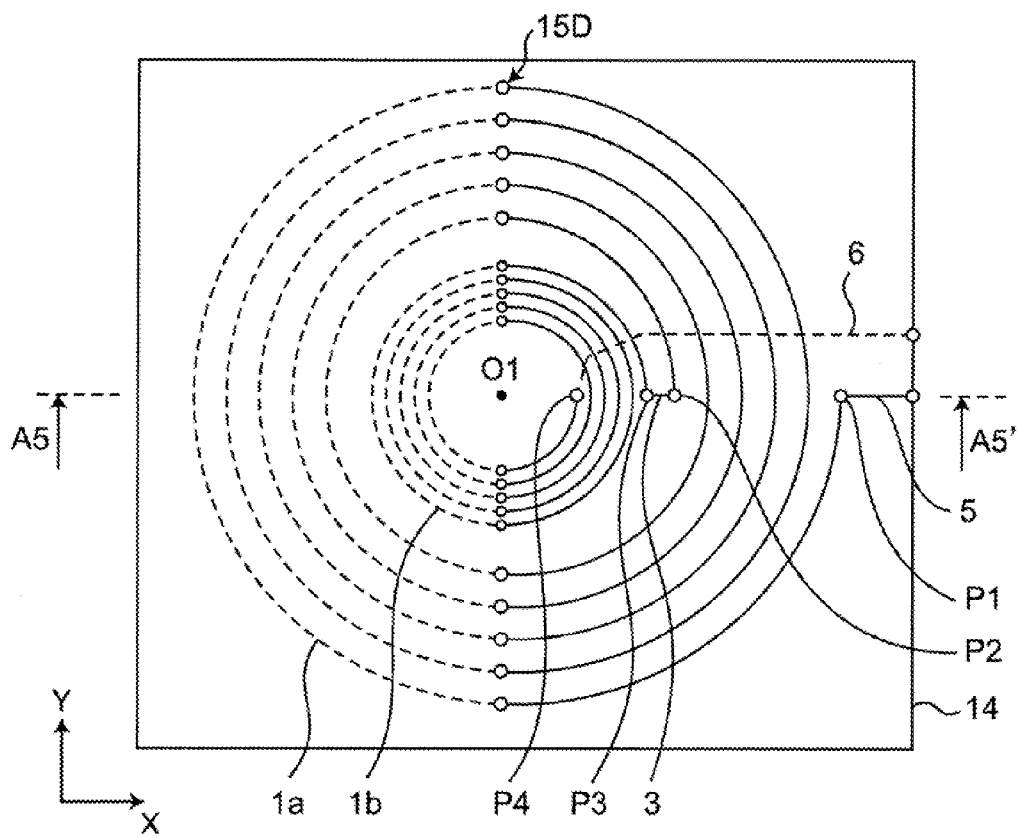
FIG. 23 is a top view showing a schematic configuration of a transmitter contactless connector apparatus according to a second modified embodiment of the fourth embodiment.
Figure 24:
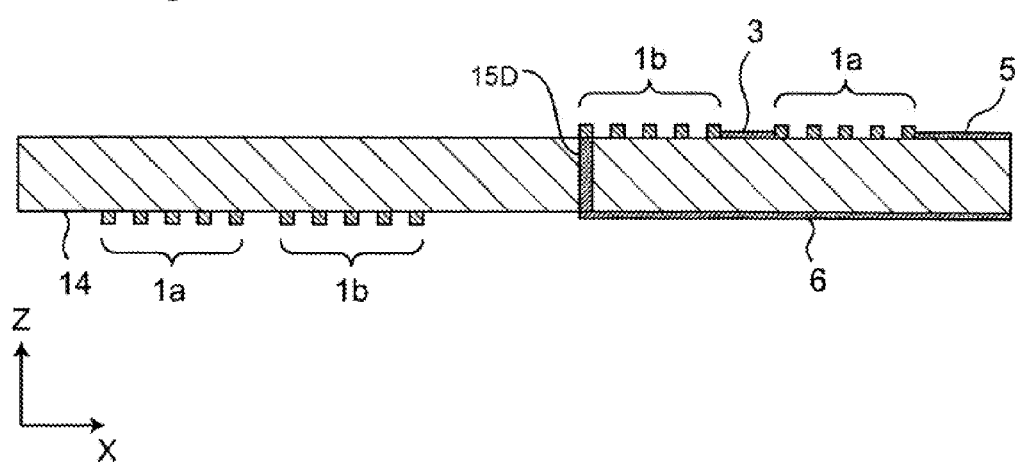
FIG. 24 is a cross-sectional view along line A5-A5' of FIG. 23.

FIG. 23 is a top view showing a schematic configuration of a transmitter contactless connector apparatus according to a second modified embodiment of the fourth embodiment. FIG. 24 is a cross-sectional view along line A5-A5' of FIG. 23. As shown in FIG. 23, transmitter coils 1a and 1b may be partially patterned on the top surface of a dielectric substrate 14, and partially patterned on the bottom surface of the dielectric substrate 14. The portions patterned on the top surface of the dielectric substrate 14 and the portions patterned on the bottom surface of the dielectric substrate 14 are connected to each other through via conductors 15D going through the dielectric substrate 14. According to the configuration of FIG. 23, the direction in which the transmitter coils are electromagnetically coupled to a receiver coil can be tilted from a vertical direction (Z-direction).

Figure 25:
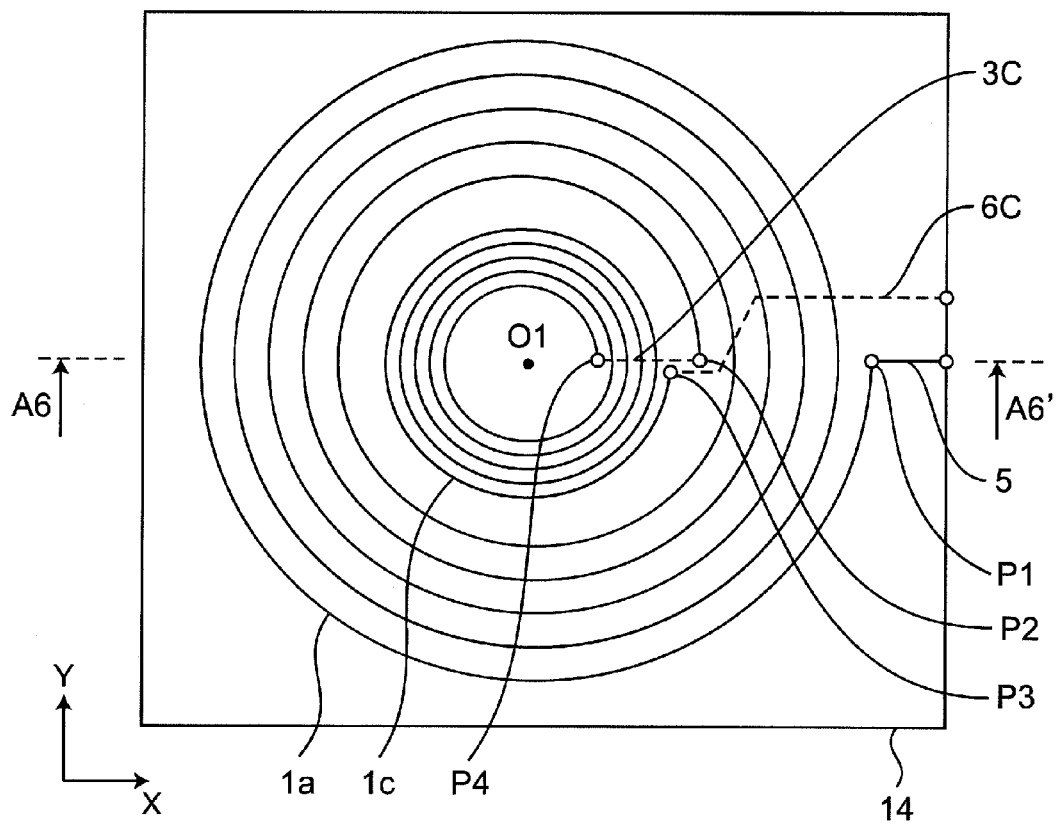
FIG. 25 is a top view showing a schematic configuration of a transmitter contactless connector apparatus according to a third modified embodiment of the fourth embodiment.
Figure 26:
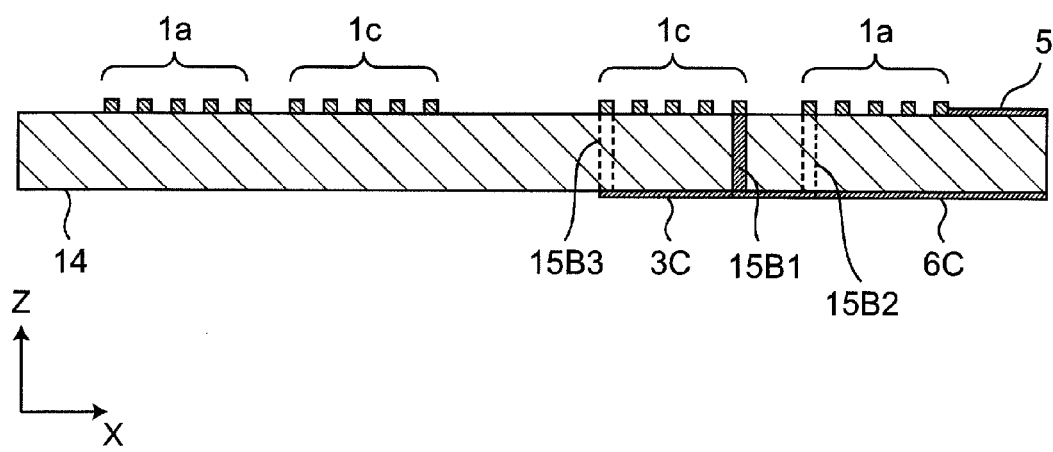
FIG. 26 is a cross-sectional view along line A6-A6' of FIG. 25.

FIG. 25 is a top view showing a schematic configuration of a transmitter contactless connector apparatus according to a third modified embodiment of the fourth embodiment. FIG. 26 is a cross-sectional view along line A6-A6' of FIG. 25. Transmitter coils 1a and 1c of FIG. 25 are the same as the transmitter coils 1a and 1c of FIG. 10. The contactless connector apparatus is provided with conducting wires 5 and 6C connected to terminals P1 and P3, respectively. The conducting wire 5 includes: a conductor patterned on the top surface of a dielectric substrate 14; and a via conductor 15B1 going through the dielectric substrate 14. The conducting wire 6C includes: a conductor patterned on the bottom surface of the dielectric substrate 14; and via conductors 15B2 and 15B3 going through the dielectric substrate 14.

Figure 27:
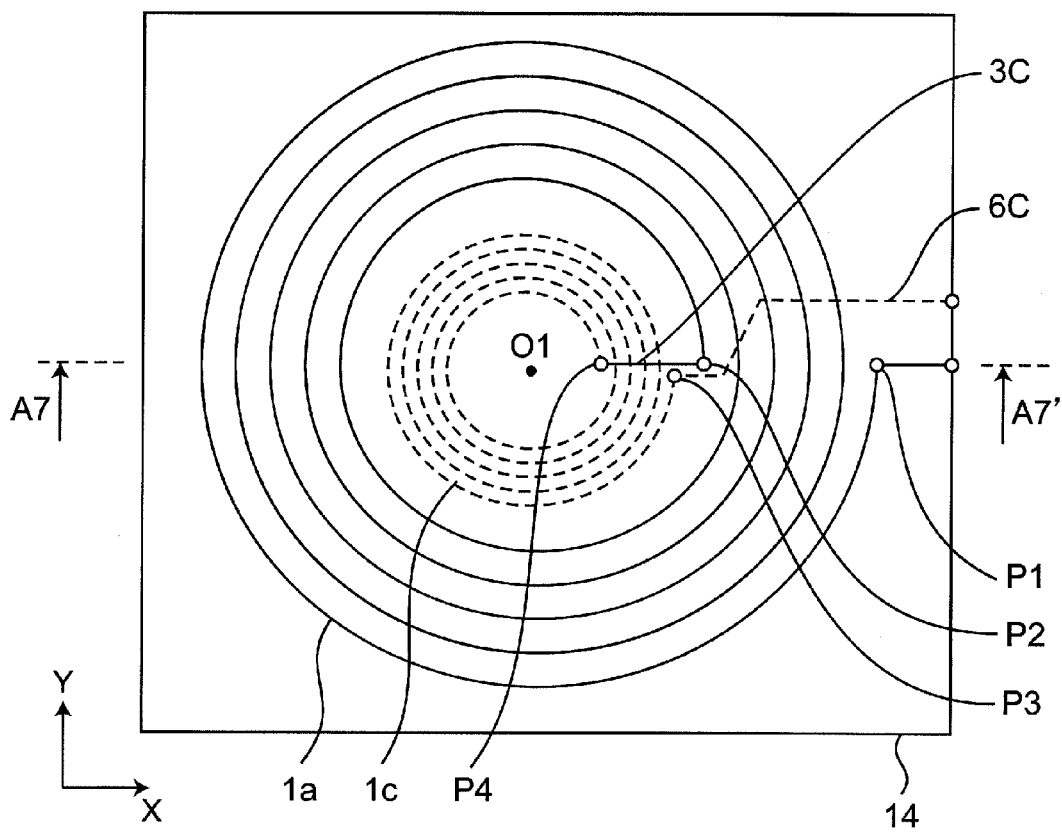
FIG. 27 is a top view showing a schematic configuration of a transmitter contactless connector apparatus according to a fourth modified embodiment of the fourth embodiment.
Figure 28:
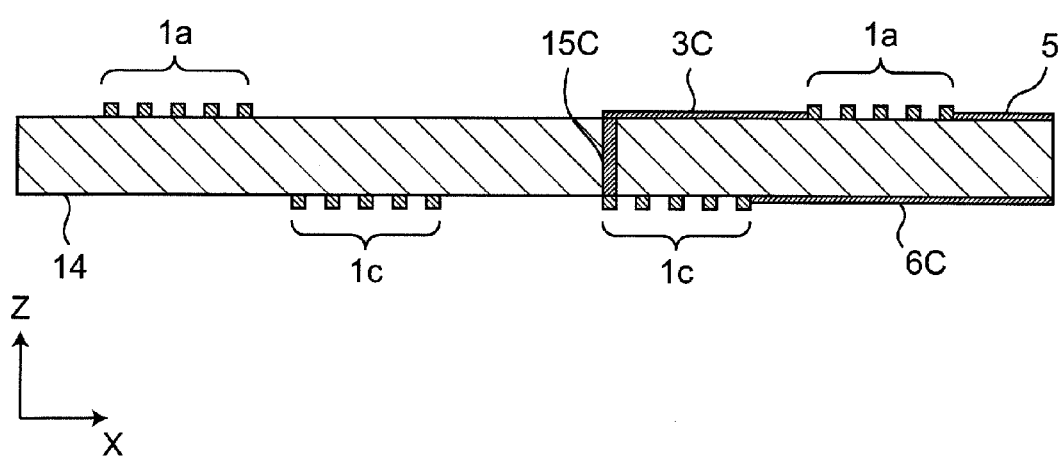
FIG. 28 is a cross-sectional view along line A7-A7' of FIG. 27.

FIG. 27 is a top view showing a schematic configuration of a transmitter contactless connector apparatus according to a fourth modified embodiment of the fourth embodiment. FIG. 28 is a cross-sectional view along line A7-A7' of FIG. 27. Referring to FIG. 27, an outer transmitter coil 1a is patterned on the top surface of a dielectric substrate 14, and an inner transmitter coil 1c is patterned on the bottom surface of the dielectric substrate 14. A connecting element 3C includes: a conductor patterned on the top surface of the dielectric substrate 14; and a via conductor 15C going through the dielectric substrate 14. A conducting wire 5 is patterned on the top surface of the dielectric substrate 14. A conducting wire 6C is patterned on the bottom surface of the dielectric substrate 14.

Figure 29:
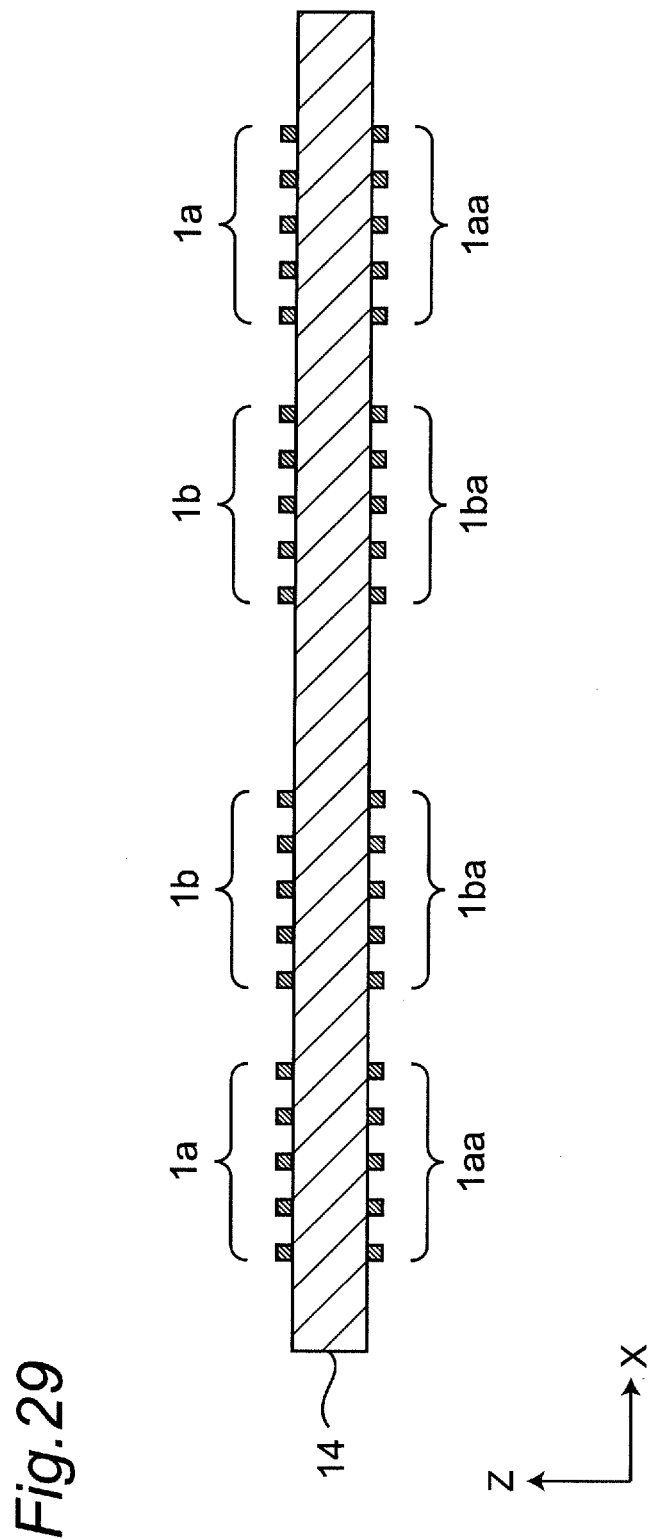
FIG. 29 is a cross-sectional view showing a schematic configuration of a transmitter contactless connector apparatus according to a fifth modified embodiment of the fourth embodiment.
Figure 30:
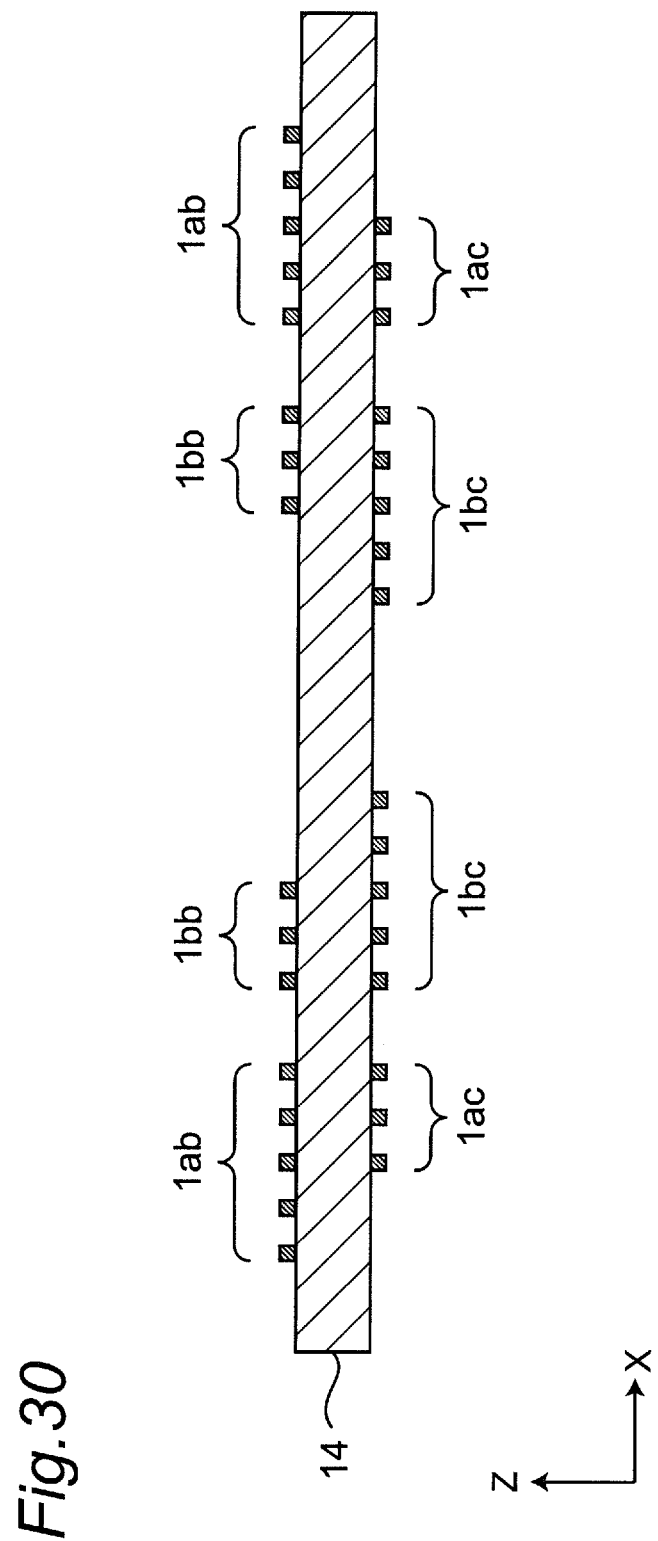
FIG. 30 is a cross-sectional view showing a schematic configuration of a transmitter contactless connector apparatus according to a sixth modified embodiment of the fourth embodiment.

FIG. 29 is a cross-sectional view showing a schematic configuration of a transmitter contactless connector apparatus according to a fifth modified embodiment of the fourth embodiment. FIG. 30 is a cross-sectional view showing a schematic configuration of a transmitter contactless connector apparatus according to a sixth modified embodiment of the fourth embodiment. As shown in FIGS. 29 and 30, transmitter coils may be patterned on both surfaces of a dielectric substrate 14. The contactless connector apparatus of FIG. 29 is provided with: outer transmitter coils 1a and 1aa patterned on both surfaces of the dielectric substrate 14; and inner transmitter coils 1b and 1ba patterned on both surfaces of the dielectric substrate 14. The contactless connector apparatus of FIG. 30 is provided with: outer transmitter coils 1ab and 1ac patterned on both surfaces of the dielectric substrate 14; and inner transmitter coils 1bb and 1bc patterned on both surfaces of the dielectric substrate 14. The number of turns of the transmitter coils may be equal between the top and bottom surfaces of the dielectric substrate 14 as shown in FIG. 29, or may be unequal between the top and bottom surfaces of the dielectric substrate 14 as shown in FIG. 30 for fine adjustment of the characteristics of the contactless connector apparatus.

According to the contactless connector apparatuses of FIGS. 19 to 30, there is an effect of reducing thickness by integrally forming the outer transmitter coil 1a and the inner transmitter coil 1b on the dielectric substrate 14.

Fifth Embodiment

FIG. 31 is a diagram showing a part of a transmitter coil of a contactless connector system according to a fifth embodiment. It is not limited to provide the outer transmitter coil 1a, the inner transmitter coil 1b, and the connecting element 3 of FIG. 1 as separate conducting wires. The outer transmitter coil 1a, the inner transmitter coil 1b, and the connecting element 3 may be configured by folding a single conducting wire. Thus, it is simplify the configuration of the transmitter coils.

On the other hand, when the outer transmitter coil 1a, the inner transmitter coil 1b, and the connecting element 3 are configured using separate conducting wires, patterned conductors, solder, etc., or configured using different materials, there is an effect of reducing the overall cost of the contactless connector apparatus, for example, by using a low-resistance material only for the outer transmitter coil 1a along a long looped path.

Sixth Embodiment

Figure 32:
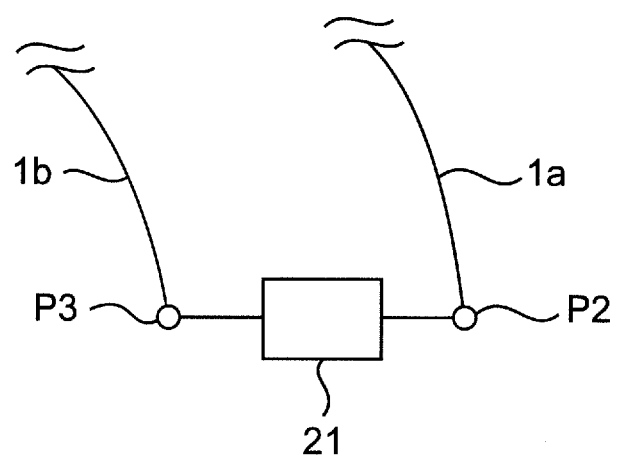
FIG. 32 is a diagram showing a part of a transmitter coil of a contactless connector system according to a sixth embodiment.

FIG. 32 is a diagram showing a part of a transmitter coil of a contactless connector system according to a sixth embodiment. A terminal P2 of an outer transmitter coil 1a and a terminal P3 of an inner transmitter coil 1b may be connected to each other through an impedance element 21, which is a passive element having a predetermined impedance. The impedance element 21 is one of a resistor, a capacitor, an inductor, and a current inverter circuit.

For example, when a resistor is used as the impedance element 21, there is an effect of decreasing the Q factor and increasing the bandwidth. Further, for example, a resistor of 1Ω or less may be used to reduce distortion of waveform and improve noise immunity.

In addition, when a capacitor is used as the impedance element 21, there is an effect of reducing the area of a matching circuit to be provided external to the transmitter coils 1a and 1b. In addition, a combination of a capacitor provided as the impedance element 21 and a capacitor provided external to the transmitter coils 1a and 1b may be used. In addition, for example, a capacitor of 100 to 300 nF may be used to adjust the resonance frequency.

In addition, when an inductor is used as the impedance element 21, there is an effect of increasing the total self-inductance of the transmitter coils 1a and 1b, the total self-inductance having decreased by winding the inner transmitter coil 1b and the outer transmitter coil 1a in opposite directions to each other. In addition, an inductor may be used to increase the electrical lengths of the transmitter coils 1a and 1b.

In addition, a current inverter circuit (e.g., a 1:1 transformer, etc.) may be used as the impedance element 21 to invert the polarity of currents flowing through the transmitter coils 1a and 1b.

By using a combination of these passive elements as the impedance element 21, there is an effect of adjusting the impedances of the transmitter coils 1a and 1b so as to further improve transmission efficiency, while reducing the area of the matching circuit.

Seventh Embodiment

Figure 33:
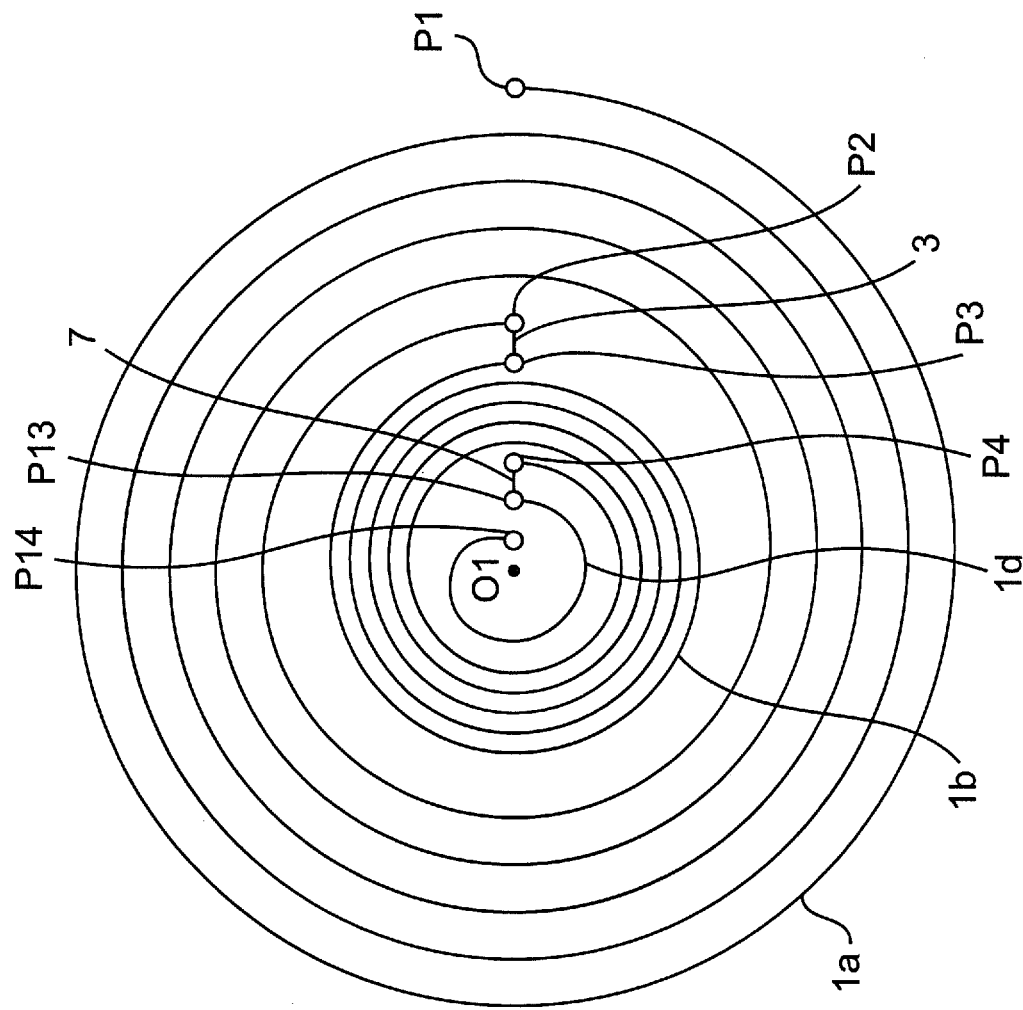
FIG. 33 is a top view showing a schematic configuration of transmitter coils of a contactless connector system according to a seventh embodiment.

FIG. 33 is a top view showing a schematic configuration of transmitter coils of a contactless connector system according to a seventh embodiment. A transmitter contactless connector apparatus may be provided with an additional transmitter coil $1d$ around an axis passing through a center O1 and further inside an inner transmitter coil $1b$ such that, when a current flows through the transmitter coils, a loop current flows around the axis in an opposite direction to that of a loop current generated around the axis by the current flowing through the inner transmitter coil $1b$. The additional transmitter coil $1d$ is wound, for example, clockwise. The additional transmitter coil $1d$ has terminals P13 and P14 at its both ends. A terminal P4 and the terminal P13 are connected to each other by a connecting element 7 such that, when a current flows through the transmitter coils, the direction of a loop current generated around the axis by the current flowing through the additional transmitter coil $1d$ is opposite to the direction of a loop current generated around the axis by the current flowing through the inner transmitter coil $1b$. According to this configuration including the additional transmitter coil $1d$, it is possible to finely adjust the characteristics of the contactless connector apparatus.

According to the configuration of FIG. 33, the direction in which the additional transmitter coil $1d$ is wound around the axis passing through the center O1 is opposite to the direction in which the inner transmitter coil $1b$ is wound around the axis. However, these directions may be the same. In this case, the transmitter coils $1a$, $1b$, and $1d$ are configured such that, when a current flows through the transmitter coils, the direction of a loop current generated around the axis by the current flowing through the additional transmitter coil $1d$ is opposite to that of a loop current generated around the axis by the current flowing through the inner transmitter coil $1b$. In addition, similarly, the contactless connector apparatus may be provided with a transmitter coil further inside the additional transmitter coil $1d$.

Eighth Embodiment

Figure 34:
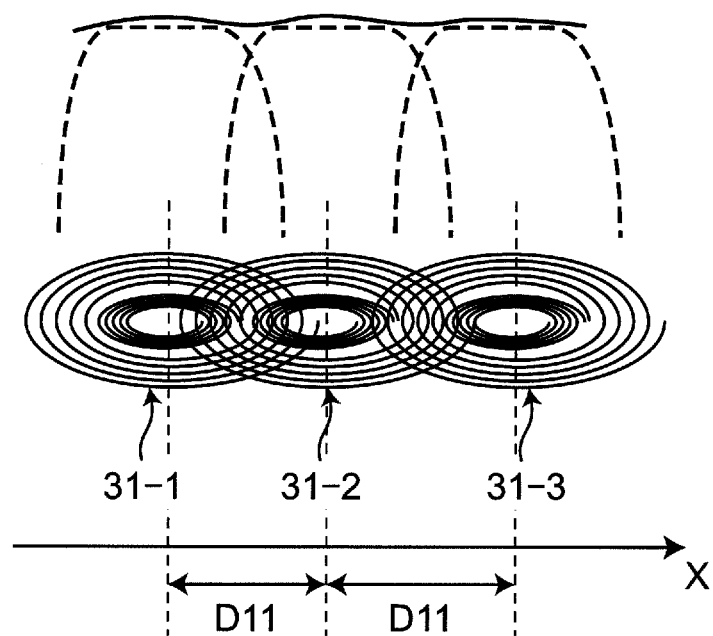
FIG. 34 is a schematic diagram showing an array of transmitter coils of a contactless connector system according to an eighth embodiment.
Figure 35:
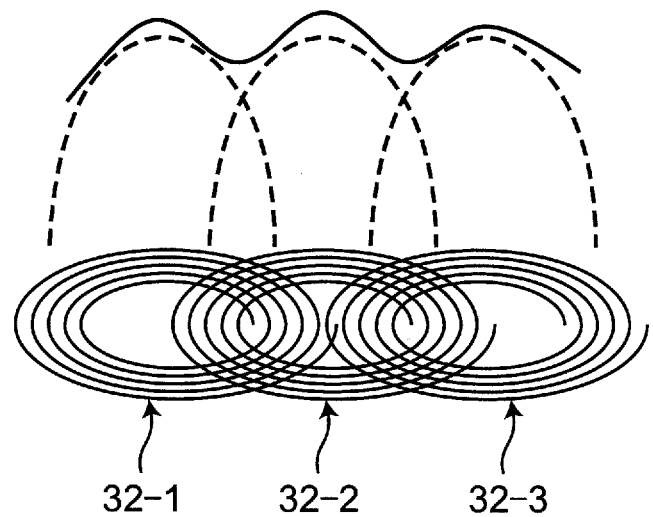
FIG. 35 is a schematic diagram showing an array of transmitter coils of a contactless connector system according to a comparison example of the eighth embodiment.

FIG. 34 is a schematic diagram showing an array of transmitter coils of a contactless connector system according to an eighth embodiment. FIG. 35 is a schematic diagram showing an array of transmitter coils of a contactless connector system according to a comparison example of the eighth embodiment. The array of FIG. 34 includes a plurality of transmitter coils 31-1 to 31-3 disposed regularly. The transmitter coils 31-1 to 31-3 are wound around a plurality of parallel axes located at regular intervals D11, respectively. Each of the transmitter coils 31-1 to 31-3 is configured in a manner similar to the transmitter coils of FIG. 1, etc. In addition, the array of FIG. 35 includes a plurality of transmitter coils 32-1 to 32-3, each configured in a manner similar to that of FIG. 6 (i.e., without the inner transmitter coil $1b$ of FIG. 1). In FIGS. 34 and 35, thick dashed lines above the transmitter coils indicate the mutual inductance between the transmitter coils and receiver coils (not shown), and solid lines above the thick dashed lines indicate the combined mutual inductance of the transmitter coils. The array of FIG. 35 has a problem that even when a plurality of transmitter coils are disposed, if a receiver coil is located between adjacent transmitter coils, then the mutual inductance decreases, and thus the transmission efficiency decreases. On the other hand, in the array of FIG. 34, even when a position displacement occurs between a transmitter coil and a receiver coil, it is possible to achieve stable power transmission with sufficiently high transmission efficiency, with a very simple configuration. Thus, there is an effect of achieving position-independent stable power transmission over the entire array. FIG. 34 shows the three transmitter coils 31-1 to 31-3 disposed along a straight line. However, four or more transmitter coils may be disposed or a plurality of transmitter coils may be disposed two-dimensionally.

Ninth Embodiment

Figure 36:
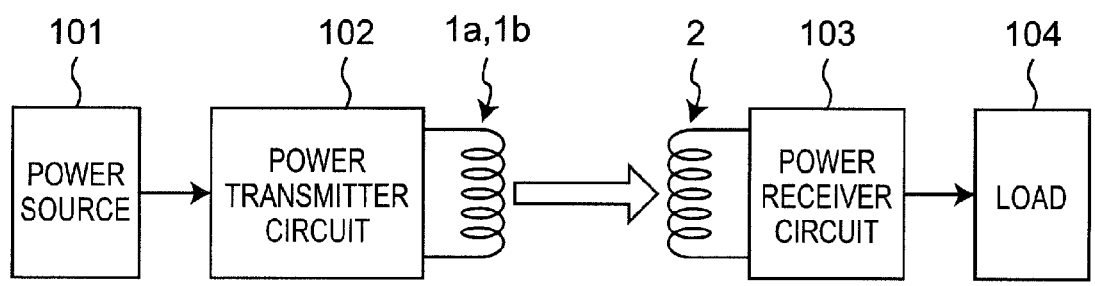
FIG. 36 is a block diagram showing a schematic configuration of a power transmission system according to a ninth embodiment.

FIG. 36 is a block diagram showing a schematic configuration of a power transmission system according to a ninth embodiment. It is possible to configure a power transmission system including any of the contactless connector systems described above. The power transmission system includes: a transmitter power transmission apparatus provided with a transmitter contactless connector apparatus; and a receiver power transmission apparatus provided with a receiver contactless connector apparatus. Referring to FIG. 36, in the transmitter power transmission apparatus, transmitter coils $1a$ and $1b$ (FIG. 1) are connected to a power transmitter circuit 102, and the power transmitter circuit 102 is connected to a power supply 101. In the receiver power transmission apparatus, a receiver coil 2 (FIG. 1) is connected to a power receiver circuit 103, and the power receiver circuit 103 is connected to a load 104 (e.g., a battery, etc.). When power is supplied to the transmitter coils $1a$ and $1b$, a current flows through the transmitter coils 1, the current generates an electromagnetic field around the transmitter coils $1a$ and $1b$, the electromagnetic field induces electromotive force in the receiver coil 2, and then, an induced current flows through the receiver coil 2. By supplying the induced current to the load 104, it is possible to achieve power transmission between the transmitter coils $1a$, $1b$ and the receiver coil 2.

According to the power transmission system of the present embodiment, it is possible to achieve stable power transmission with sufficiently high transmission efficiency, with a very simple configuration, even when a position displacement occurs between the transmitter coils $1a$, $1b$ and the receiver coil 2.

Using the above-described contactless connector systems, signals may be transmitted instead of transmitting power.

It is possible to configure an induction heating apparatus based on the principle of the above-described power transmission systems. In the induction heating apparatus, the transmitter coils of FIG. 1 serving as induction heating coils are connected to a cooking circuit, and the cooking circuit is connected to a power supply. Further, a cooking container for induction heating, such as a pot, is provided, instead of the receiver coil 2 of FIG. 1. The pot is provided close to the transmitter coils so as to be electromagnetically coupled to the transmitter coils. When a current flows through the transmitter coils due to the electromagnetic coupling between the transmitter coils and the pot, the current generates an electromagnetic field around the transmitter coils, the electromagnetic field induces electromotive force on the bottom of the pot, and then, an induced eddy current flows on the bottom of the pot. Since the eddy current can be considered equivalent to a lossy coil, it is possible to define the self-inductance of the pot, and the mutual inductance between the transmitter coils and the pot. According to such an induction heating apparatus, it is possible to stably heat the pot with sufficiently high transmission efficiency, with a very simple configuration, even when a position displacement occurs between the transmitter coils and the pot.

Although the second to ninth embodiments have been described with reference to the transmitter contactless connector apparatus, their configurations can also be applied to a receiver contactless connector apparatus (FIG. 12).

In addition, the transmitter coils and the receiver coils are not limited to be circular shaped, and may be shaped in any shape such as rectangles and ovals.

In addition, the number of turns of the outer transmitter coil and the number of turns of the inner transmitter coil are not limited to integral numbers, and may be fractional numbers or decimal numbers.

In addition, the outer transmitter coil and the inner transmitter coil may partially overlap each other. In addition, the outer transmitter coil and the inner transmitter coil may be on different planes as shown in FIGS. 21 and 22, etc., as long as they are substantially on the same plane. In addition, each of the outer transmitter coil and the inner transmitter coil is not limited to be wound in a single layer, and may be wound in multiple layers.

In addition, FIG. 1, etc. show that the transmitter coils and the receiver coil are arranged to be parallel to each other. However, the arrangement is not limited thereto, and any other arrangement (e.g., an arrangement where the receiver coil is tilted with respect to the transmitter coils, etc.) may be used as long as the transmitter coils and the receiver coil can be electromagnetically coupled to each other.

In addition, FIG. 1, etc. show that each of the transmitter coils and the receiver coil is wound on a plane. However, the manner of winding the coils is not limited thereto, and the transmitter coils and the receiver coil may be wound in any other form, such as a solenoid, as long as the transmitter coils and the receiver coil are electromagnetically coupled to each other.

The windings of the outer transmitter coil and the inner transmitter coil are not limited to a single wire, and it is possible to use a Litz wire (for reducing resistance), a conductive pattern of a printed circuit board (for reducing thickness), a ribbon wire (for reducing resistance), twisted pair wire (for reducing resistance), etc. The material of the windings is not limited to copper wire, and it is possible to use a multilayered winding, such as copper-clad aluminum wire (for reducing weight) and magnetic-coated copper wire (for reducing loss).

The configurations exemplified above may be combined together.

Base on theoretical calculations, we will describe below the effects brought about by the contactless connector systems according to the described embodiments of the present disclosure.

First Implementation Example

Figure 37:
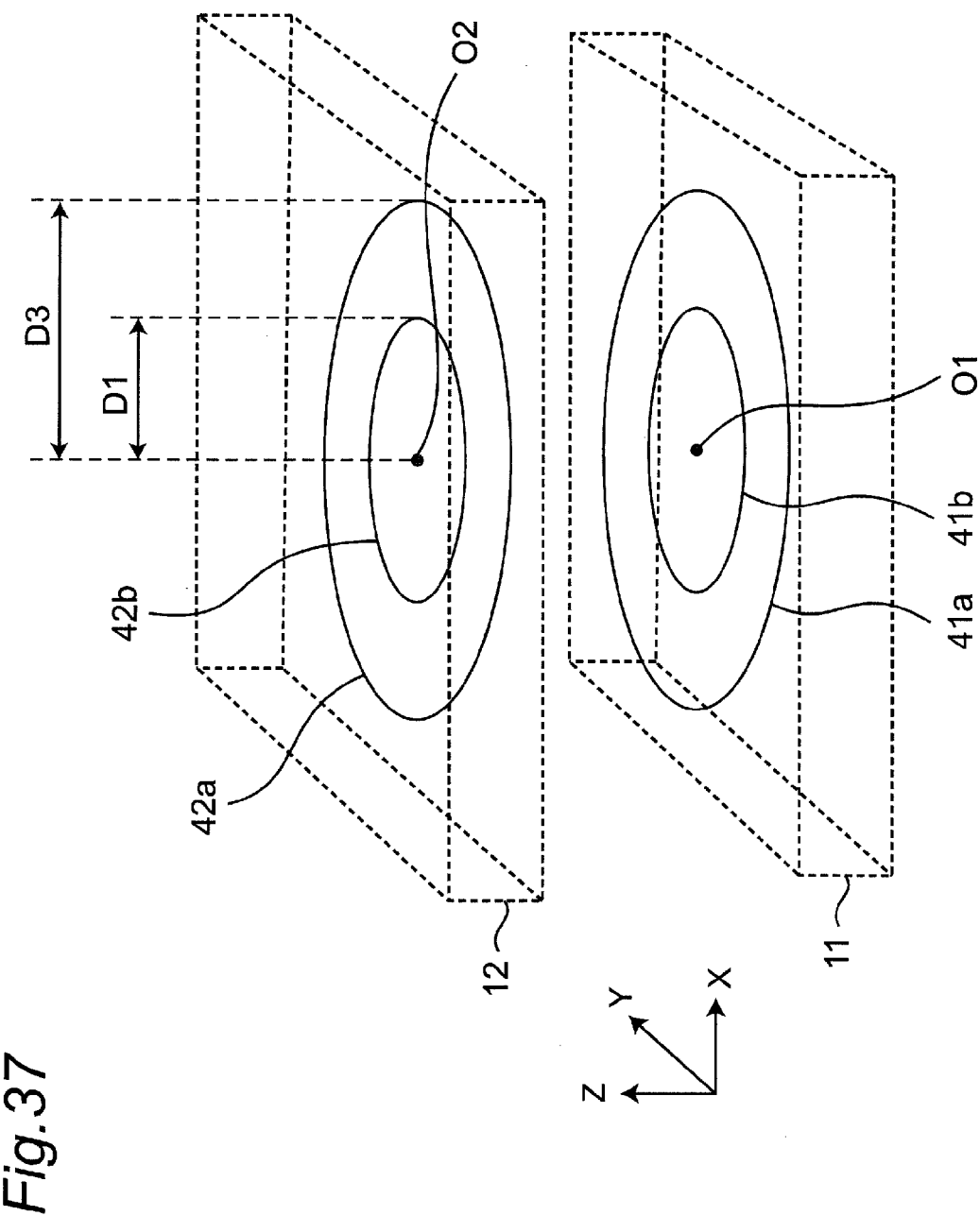
FIG. 37 is a perspective view showing a model of transmitter coils and receiver coils of a contactless connector system according to a first implementation example.

FIG. 37 is a perspective view showing a model of transmitter coils and receiver coils of a contactless connector system according to a first implementation example. When each of the transmitter coils 1a and 1b of FIG. 1 is wound with one turn, the receiver coil 2 of FIG. 1 is wound with two turns, and the transmitter coils 1a, 1b and the receiver coil 2 are sufficiently small compared to the wavelength (when the entire length of the winding is about ⅒ of the wavelength, e.g., ¹⁄₁₀₀), the coils can be approximately replaced by double loops as shown in FIG. 37. It is considered that transmitter coils include an outer transmitter coil 41a and an inner transmitter coil 41b, and receiver coils include an outer receiver coil 42a and an inner receiver coil 42b. In the first implementation example, currents flow through the outer transmitter coil 41a and the inner transmitter coil 41b in opposite directions to each other. In addition, as a first comparison example, the case is also considered in which currents flow through the outer transmitter coil 41a and the inner transmitter coil 41b in the same direction. In both the first implementation example and the first comparison example, currents flow through the outer receiver coil 42a and the inner receiver coil 42b in the same direction.

We calculated changes in mutual inductance for the case in which the inner transmitter coil 41b and the inner receiver coil 42b had the radius $D1=16$ mm, the outer transmitter coil 41a and the outer receiver coil 42a had the radius $D3=8$ mm, the transmitter coils and the receiver coils were separated by the distance $dz=2$ mm, and the position displacement dx defined in a manner similar to that in FIG. 3 was changed from 0 to 20 mm. The mutual inductance M between the transmitter coils and the receiver coils of the contactless connector system of FIG. 37 can be decomposed into four components, i.e., $M=M11+M12+M21+M22$. "M11" denotes the mutual inductance between the inner transmitter coil 41b and the inner receiver coil 42b, "M12" denotes the mutual inductance between the outer transmitter coil 41a and the inner receiver coil 42b, "M21" denotes the mutual inductance between the inner transmitter coil 41b and the outer receiver coil 42a, and "M22" denotes the mutual inductance between the outer transmitter coil 41a and the outer receiver coil 42a.

Figure 38:
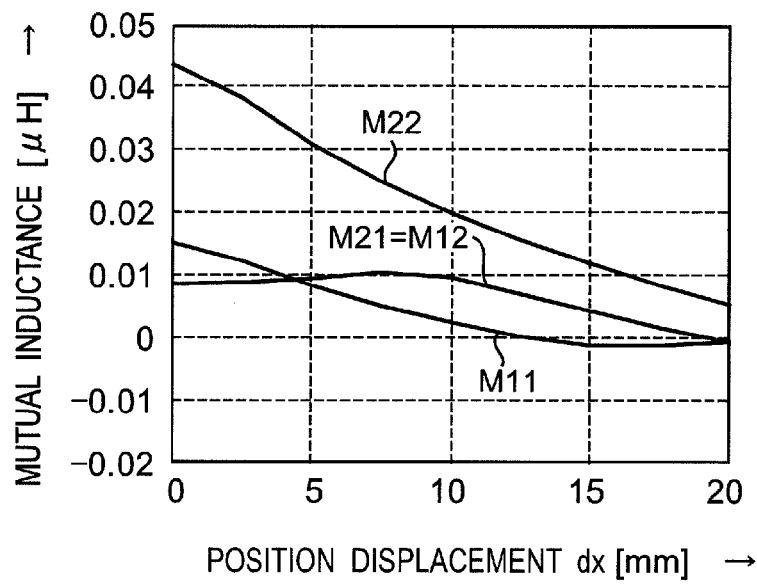
FIG. 38 is a graph showing the mutual inductances between coils of a contactless connector system according to a first comparison example.

FIG. 38 is a graph showing the mutual inductances between the coils of the contactless connector system according to the first comparison example. It can be seen that as the position displacement dx increases, the mutual inductances M22 and M11 decrease. However, since the mutual inductance M11 becomes negative when the position displacement dx increases to about 15 mm, it is expected from the definition that the mutual inductance M11 causes the overall mutual inductance M to decrease.

Figure 39:
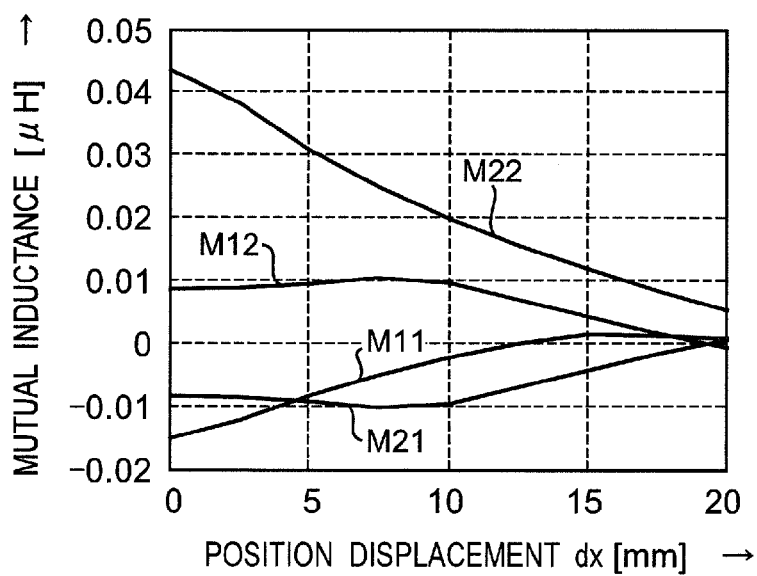
FIG. 39 is a graph showing the mutual inductances between the coils of the contactless connector system according to the first implementation example.

FIG. 39 is a graph showing the mutual inductances between the coils of the contactless connector system according to the first implementation example. It can be seen that as a result of currents flowing through the outer transmitter coil 41a and the inner transmitter coil 41b in opposite directions to each other, the signs of the mutual inductances M11 and M21 are reversed from the case of FIG. 38, and the mutual inductance M11 becomes positive at the position displacement $dx=15$ mm.

Figure 40:
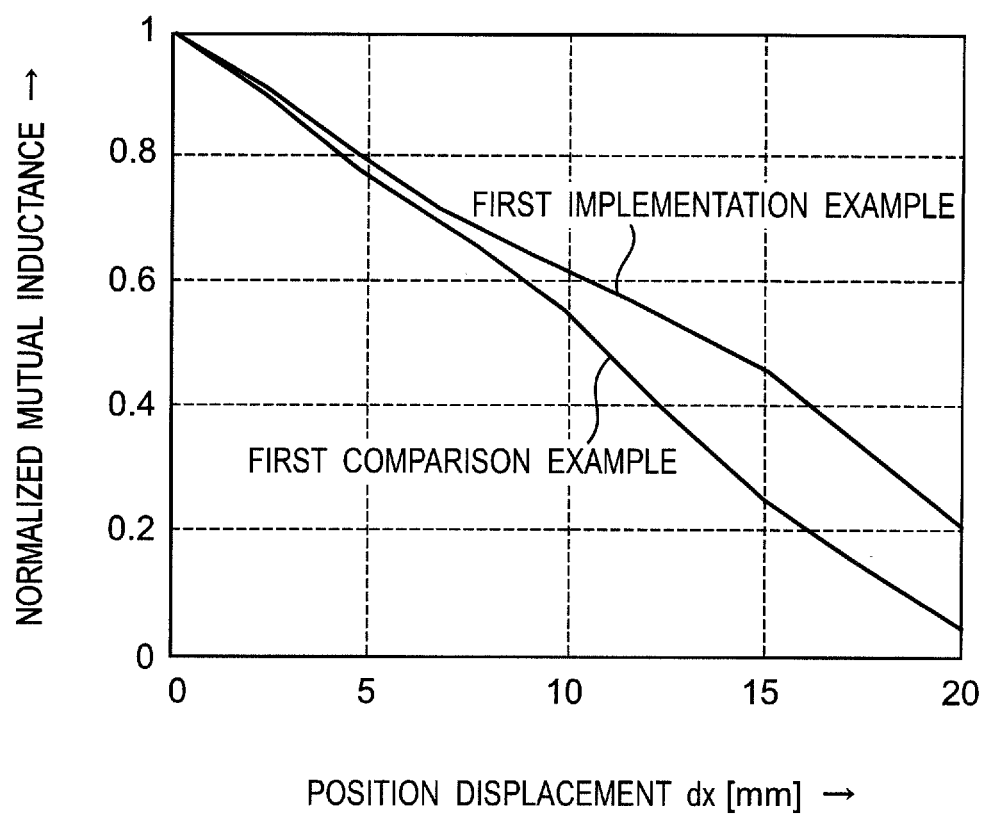
FIG. 40 is a graph showing the sums of the mutual inductances shown in FIGS. 38 and 39.

FIG. 40 is a graph showing the sums of the mutual inductances shown in FIGS. 38 and 39. It can be seen that the amount of change in mutual inductance of the contactless connector system of the first implementation example is small compared to that of the contactless connector system of the first comparison example. Thus, it has been found that according to the contactless connector system of the first implementation example, there is an effect of preventing changes in transmission efficiency even when a position displacement occurs between the transmitter coils and the receiver coils.

Second Implementation Example

Figure 41:
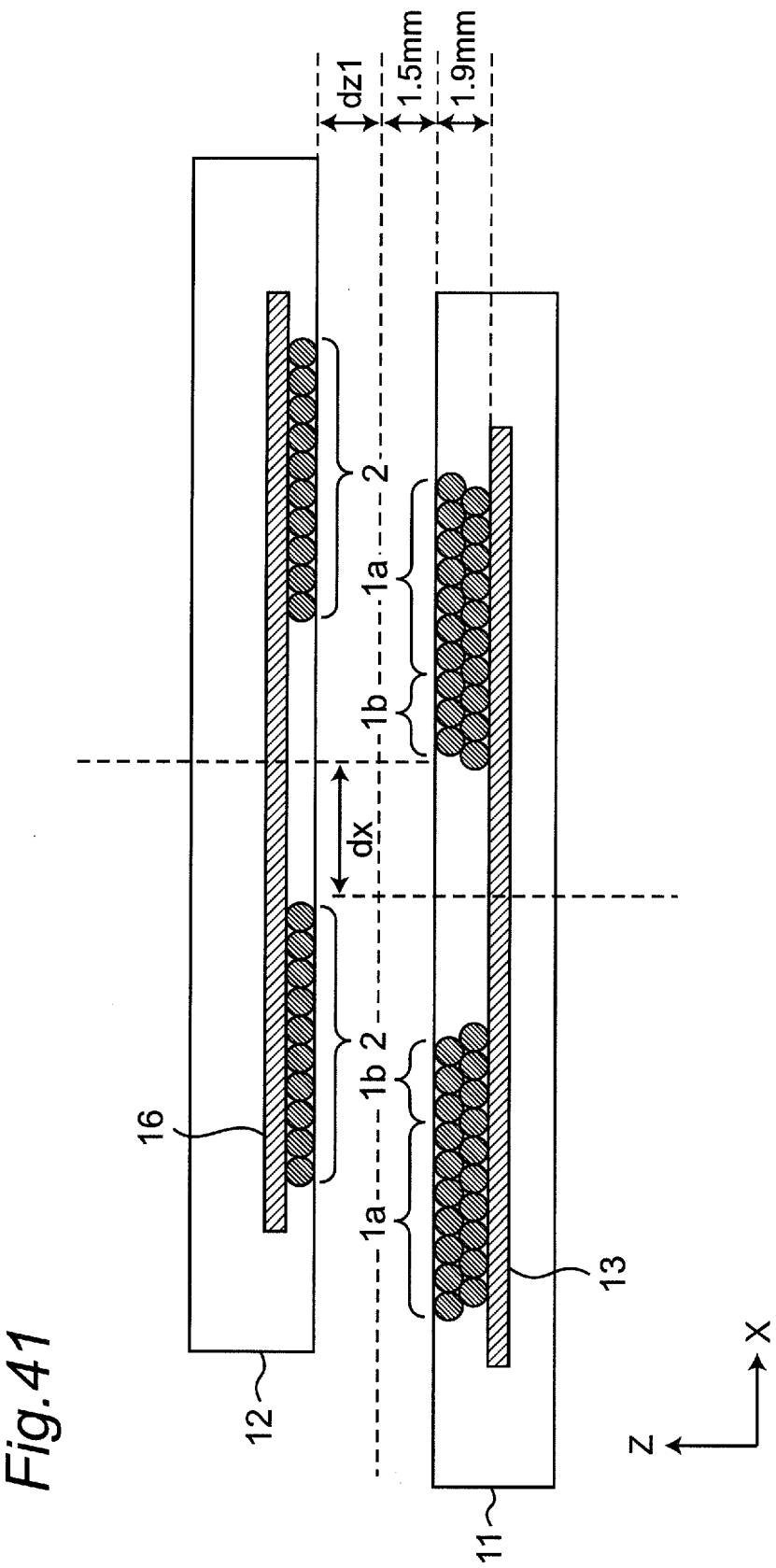
FIG. 41 is a cross-sectional view showing a schematic configuration of a contactless connector system according to a second implementation example.

FIG. 41 is a cross-sectional view showing a schematic configuration of a contactless connector system according to a second implementation example. Litz wire including a bundle of 100 strands with a diameter of 0.08 mm was used as transmitter coils. The transmitter coils were configured as an outer transmitter coil 1a and an inner transmitter coil 1b wound in opposite directions to each other, the outer transmitter coil 1a and the inner transmitter coil 1b including a spiral coil of Litz wire with 20 turns in two layers, and formed by temporarily picking up the inner 6 turns of the spiral coil, flipping it, and returning it to its original position. The outer diameter of the outer transmitter coil 1a was 39 mm. The transmitter coils 1a and 1b had the overall self-inductance of 9.6 µH, and the resistance of 69 ma Ω. In the case where a magnetic substrate 13 having a relative permeability of 2400 was loaded, the transmitter coils 1a and 1b had the overall self-inductance of 13.6 µH, and the resistance of 123 mΩ. When considered using the equivalent circuit of FIG. 4, the internal impedance Z01 was 1Ω and the capacitance of the capacitor C1 was 270 pF. In addition, receiver coils A and B having the following two sets of sizes and equivalent circuit parameters (FIG. 4) were used as a receiver coil 2.

(Receiver Coil A)
Outer diameter: 32 mm
Number of turns: 18
C2: 82 nF
dz1: 1.0 mm
Z02: 8.7Ω
(Receiver Coil B)
Outer diameter: 30 mm
Number of turns: 30
C2: 56 nF
dz1: 2.0 mm
Z02: 10.0 Ω

In addition, a spiral coil of Litz wire with 20 turns in the same direction (i.e., the case of not flipping the winding of an inner transmitter coil 1b) was also configured as transmitter coils of a second comparison example. In this case, when considered using the equivalent circuit of FIG. 4, the internal impedance Z01 was 1Ω, and the capacitance of the capacitor C1 was 120 pF.

Figure 42:
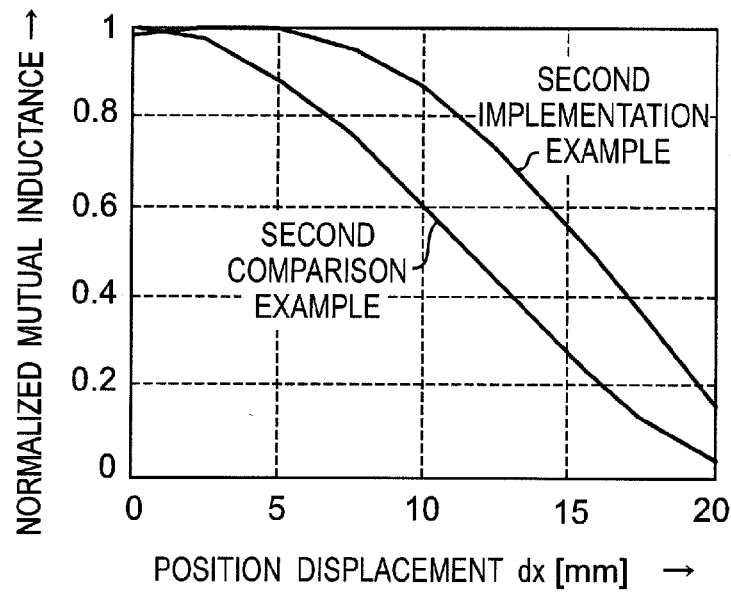
FIG. 42 is a graph showing the mutual inductances of the contactless connector systems according to the second implementation example and a second comparison example.

FIG. 42 is a graph showing the mutual inductances of the contactless connector systems according to the second implementation example and the second comparison example. It can be seen that according to the second implementation example, since the transmitter coils 1a and 1b is configured such that, when a current flows through the transmitter coils, the direction of a loop current generated around an axis passing through the center by the current flowing through the inner transmitter coil 1b is opposite to the direction of a loop current generated around the axis by the current flowing through the outer transmitter coil 1a, it is possible to prevent changes in mutual inductance even when a position displacement occurs between the transmitter coils and the receiver coil.

Figure 43:
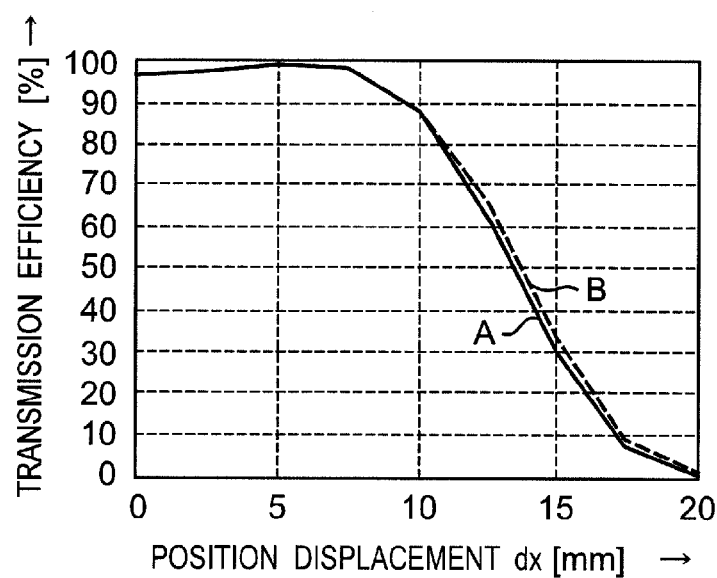
FIG. 43 is a graph showing the transmission efficiency of the contactless connector system according to the second comparison example.
Figure 44:
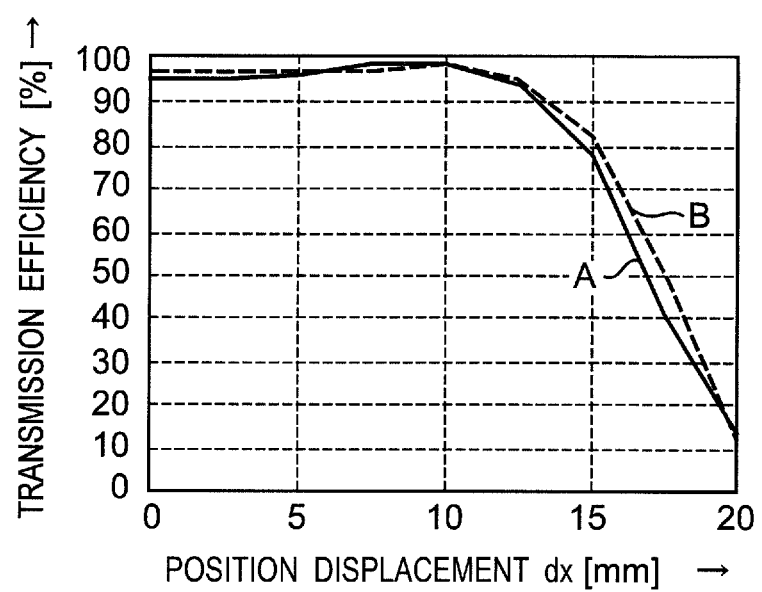
FIG. 44 is a graph showing the transmission efficiency of the contactless connector system according to the second implementation example.

FIG. 43 is a graph showing the transmission efficiency of the contactless connector system according to the second comparison example. FIG. 44 is a graph showing the transmission efficiency of the contactless connector system according to the second implementation example. When the range having the transmission efficiency of 80% or more is defined as a coverage area, up to the position displacement dx=11 mm can be used in the second comparison example, and up to the position displacement dx=15 mm can be used in the second implementation example. Thus, the coverage area can be expanded by a factor of 1.4.

Third Implementation Example

Figure 45:
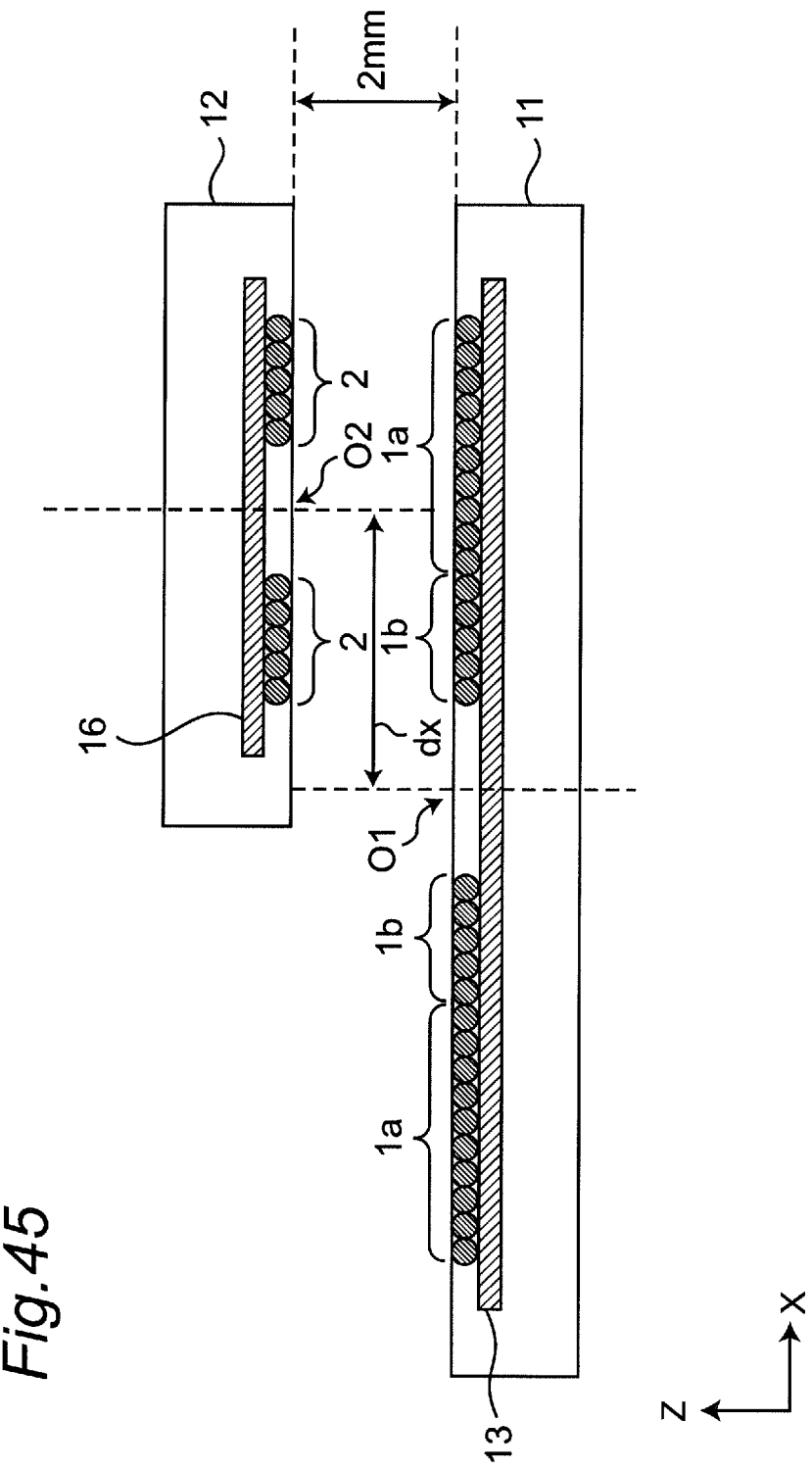
FIG. 45 is a cross-sectional view showing a schematic configuration of a contactless connector system of a third implementation example.

FIG. 45 is a cross-sectional view showing a schematic configuration of a contactless connector system of a third implementation example. We calculated changes in transmission efficiency with respect to a position displacement, for the case where transmitter coils had a fixed total number of turns N=15, and the number of turns of an outer transmitter coil 1a and the number of turns of an inner transmitter coil 1b were changed. We used the transmitter coils having an outer diameter of 70 mm, an inner diameter of 40 mm, 15 turns, and a copper wire diameter of 1.0 mm, and used a receiver coil having an outer diameter of 30 mm, an inner diameter of 10 mm, and 30 turns. In addition, magnetic substrates 13 and 16 had the thickness of 0.5 mm, and the relative permeability of 2400.

Figure 46:
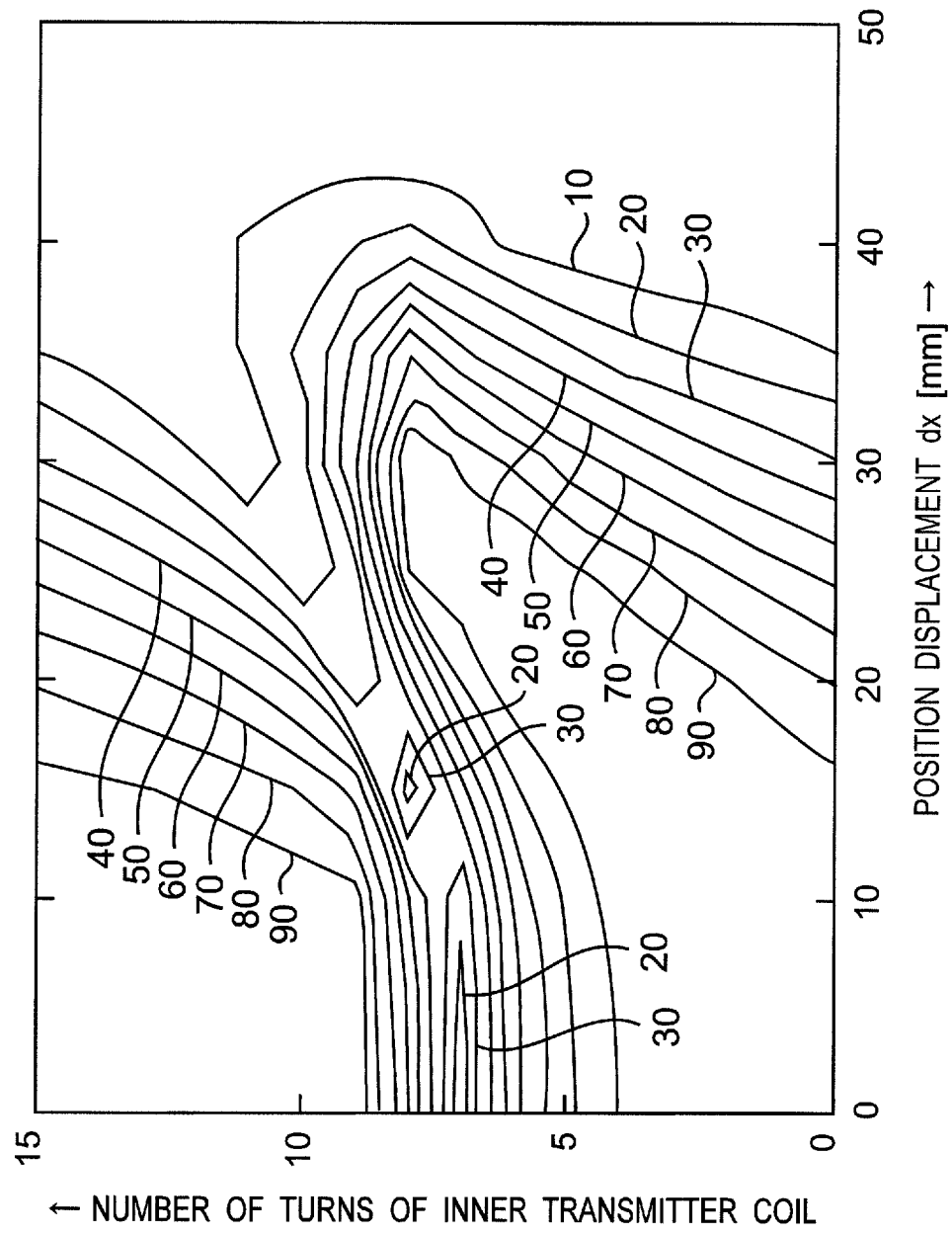
FIG. 46 is a graph showing changes in mutual inductance with respect to a position displacement dx, and with respect to the number of turns of inner coils, of the contactless connector system of FIG. 45.

FIG. 46 is a graph showing changes in mutual inductance with respect to a position displacement dx, and with respect to the number of turns of inner coils, of the contactless connector system of FIG. 45. The horizontal axis represents the position displacement dx of the receiver coil, and the vertical axis represents the number of turns of the inner transmitter coils. For each of these conditions, the ratio of the mutual inductance to the peak value [%] (i.e., normalized mutual inductance) is represented by contour lines. According to the simulation results, it can be seen that when the inner transmitter coils has zero turn, the mutual inductance becomes 80% of the peak value at the position of the position displacement dx=20 mm. On the other hand, it can be seen that when the inner transmitter coils has four turns, the distance at which the mutual inductance becomes 80% of the peak value is extended to the position displacement dx=25 mm. It has been found from the simulation results that in this calculation conditions, it is possible of improve tolerance to a position displacement when the ratio of the number of turns of the inner transmitter coils to the total number of turns N=15 is ⅓ or less.

Fourth Implementation Example

Figure 47:
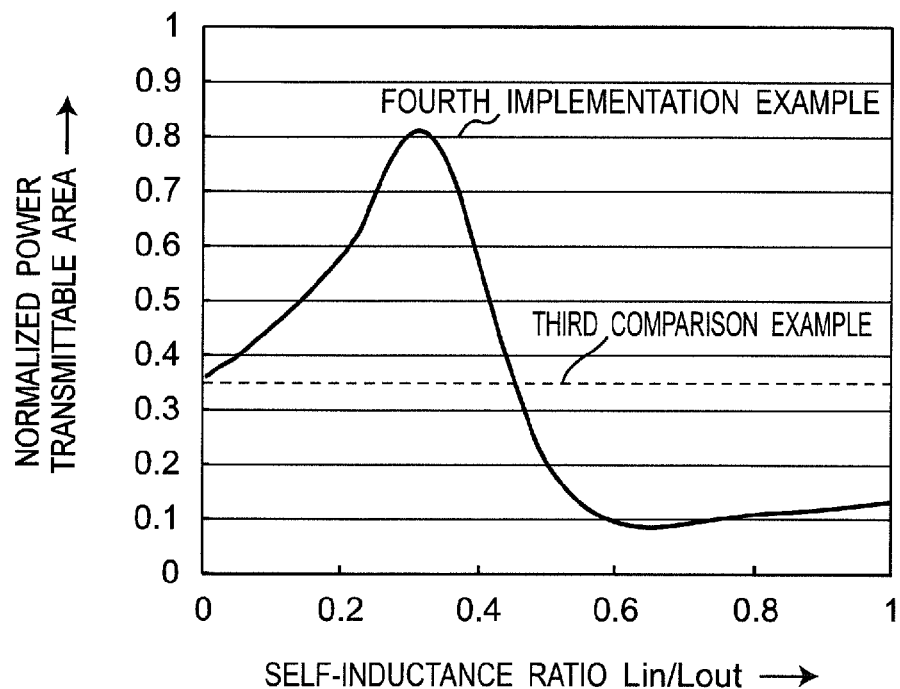
FIG. 47 is a graph showing normalized power transmittable areas of contactless connector systems according to a fourth implementation example and a third comparison example.

FIG. 47 is a graph showing normalized power transmittable areas of contactless connector systems according to a fourth implementation example and a third comparison example. In the fourth implementation example, we used transmitter coils having an inner diameter of 12 mm, an outer diameter of 40 mm, and 15 turns, and used a receiver coil having an inner diameter of 10 mm, an outer diameter of 30 mm, and 11 turns. The distance dz between the transmitter coils and the receiver coil was 5 mm. The transmitter coils of the fourth implementation example were configured such that the transmitter coils included an outer transmitter coil and an inner transmitter coil, and currents flowed through the outer transmitter coil and the inner transmitter coil in the opposite directions to each other. In this case, the numbers of turns of the outer transmitter coil and the inner transmitter coil were configured to change the ratio of the self-inductance of the inner transmitter coil "Lin" to the self-inductance of the outer transmitter coil "Lout" (Lin/Lout). In the third comparison example, we used transmitter coils and a receiver coil that have the same dimensions as those in the fourth implementation example. However, the transmitter coils of the third comparison example were configured such that a current flowed through an outer transmitter coil and an inner transmitter coil in the same direction in a manner similar to that in FIG. 6.

The simulation results of FIG. 47 were obtained as follows. When the transmitter coils having a predetermined self-inductance ratio Lin/Lout are configured, the range of displacement, where the change in mutual inductance within ±20% occurs when displacing the receiver coil with respect to the transmitter coils in the X-direction, is defined as a "power transmittable area" capable of stable power transmission. The vertical axis in FIG. 47 represents the power transmittable area normalized by the radius of the transmitter coils. According to the third comparison example, even when the transmitter coil is split into the outer transmitter coil and the inner transmitter coil, their mutual inductances do not change, and thus, the power transmittable area is constant regardless of the self-inductance ratio Lin/Lout. On the other hand, according to the fourth implementation example, it can be seen that as the self-inductance of the inner transmitter coil (the number of reverse turns) increases, the power transmittable area is expanded. However, it can be seen that when the self-inductance ratio Lin/Lout becomes 0.45 or more, the power transmittable area of the fourth implementation example falls below that of the third comparison example. This is because the magnetic flux at the center is cancelled out by the outer transmitter coil and the inner transmitter coil.

Figure 48:
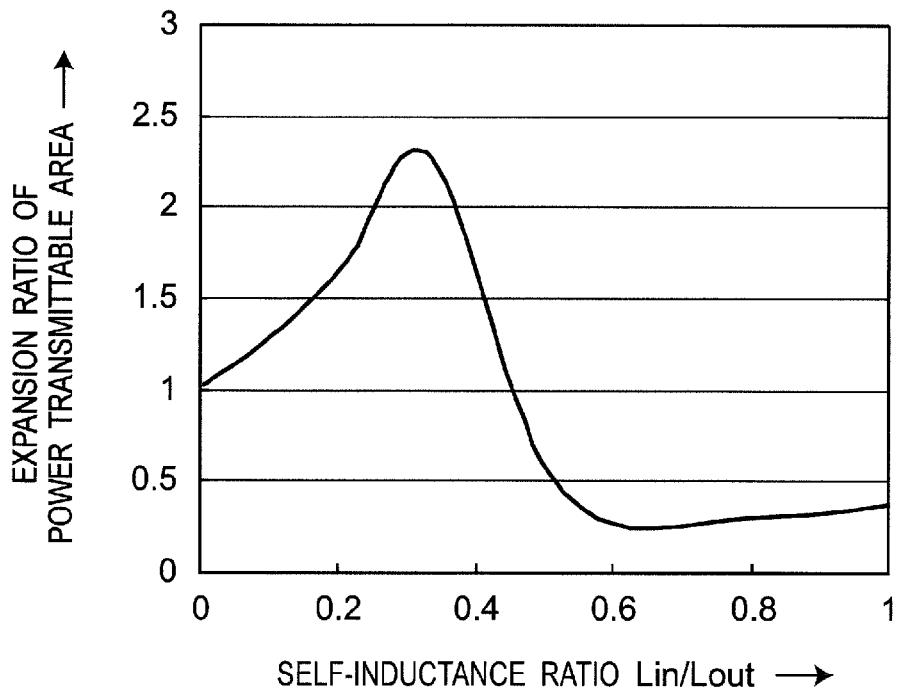
FIG. 48 is a graph showing an expansion ratio of the power transmittable areas of the contactless connector systems according to the fourth implementation example and the third comparison example.

FIG. 48 is a graph showing an expansion ratio of the power transmittable areas of the contactless connector systems according to the fourth implementation example and the third comparison example. FIG. 48 shows the ratio of the power transmittable area of the fourth implementation example to the power transmittable area of the third comparison example. According to FIG. 48, it can be seen that the expansion ratio becomes two or more, i.e., its maximum value, near the self-inductance ratio Lin/Lout of 0.3. However, it can be seen that when the self-inductance ratio Lin/Lout is 0.45 or more, the expansion ratio of the power transmittable area becomes one or less, and thus the power transmittable area becomes narrower than that of the third comparison example. Therefore, it is possible to maximize the power transmittable area by optimizing the self-inductance ratio between the inner transmitter coil and the outer transmitter coil.

According to FIGS. 47 and 48, it is possible to bring about the effect of expanding the power transmittable area by setting the self-inductance ratio Lin/Lout to less than 0.45. In addition, the best effect is obtained when setting the self-inductance ratio Lin/Lout to 0.3.

SUMMARY OF EMBODIMENTS

A contactless connector apparatus, a contactless connector system, a power transmission apparatus, and a power transmission system according to the aspects of the present disclosure are configured as follows.

According to a contactless connecter apparatus as the first aspect of the present disclosure, a contactless connector apparatus is provided with a first coil closely opposed to a second coil so as to be electromagnetically coupled to the second coil. The first coil includes: an inner coil wound around an axis passing through a center of the first coil; and an outer coil wound around the axis and outside the inner coil. One end of the outer coil and one end of the inner coil are connected to each other such that, when a current flows through the first coil, a direction of a loop current generated around the axis by a current flowing through the inner coil is opposite to a direction of a loop current generated around the axis by a current flowing through the outer coil. A self-inductance of the outer coil is larger than a self-inductance of the inner coil.

According to a contactless connecter apparatus as the second aspect, in the contactless connecter apparatus of the first aspect, a ratio of the self-inductance of the inner coil to the self-inductance of the outer coil is greater than 0 and less than 0.45.

According to a contactless connecter apparatus as the third aspect, in the contactless connecter apparatus of the first or second aspect, a direction in which the inner coil is wound around the axis is opposite to a direction in which the outer coil is wound around the axis.

According to a contactless connecter apparatus as the fourth aspect, in the contactless connecter apparatus of the first or second aspect, a direction in which the inner coil is wound around the axis is same as to a direction in which the outer coil is wound around the axis.

According to a contactless connecter apparatus as the fifth aspect, the contactless connecter apparatus of one of the first to fourth aspects is further provided with a magnetic substrate provided on one side with respect to the first coil, the one side being opposite to a side where the second coil is provided close to the first coil.

According to a contactless connecter apparatus as the sixth aspect, the contactless connecter apparatus of the fifth aspect is further provided with a conducting wire connected to the first coil. The magnetic substrate has a groove into which at least a part of the first coil and the conducting wire is inserted.

According to a contactless connecter apparatus as the seventh aspect, in the contactless connecter apparatus of one of the first to sixth aspects, the first coil has a first end close to the axis and a second end remote from the axis. The contactless connector apparatus further comprises a conducting wire connected to the first end, and the conducting wire is wound around the axis so as to gradually increase a distance from the axis.

According to a contactless connecter apparatus as the eighth aspect, in the contactless connecter apparatus of one of the first to seventh aspects, each of the outer coil and the inner coil is formed on at least one surface of a printed circuit board using a circuit patterning method.

According to a contactless connecter apparatus as the ninth aspect, in the contactless connecter apparatus of one of the first to eighth aspects, one end of the outer coil and one end of the inner coil are connected to each other through an impedance element, and the impedance element is one of a resistor, a capacitor, an inductor, and a current inverter circuit.

According to a contactless connecter apparatus as the tenth aspect, the contactless connecter apparatus of one of the first to ninth aspects includes a plurality of first coils wound around a plurality of parallel axes located at regular intervals, respectively.

According to a contactless connecter system as the eleventh aspect, the contactless connecter system includes: a contactless connector apparatus of one of the first to tenth aspects, serving as a transmitter contactless connector apparatus; and a receiver contactless connector apparatus comprising a second coil.

According to a contactless connecter system as the twelfth aspect, the contactless connecter system includes: a transmitter contactless connector apparatus comprising a second coil; and a contactless connector apparatus of one of the first to tenth aspects, serving as a receiver contactless connector apparatus.

According to a contactless connecter system as the thirteenth aspect, the contactless connecter system includes: a contactless connector apparatus of one of the first to tenth aspects, serving as a transmitter contactless connector apparatus; and a contactless connector apparatus of one of the first to tenth aspects, serving as a receiver contactless connector apparatus.

According to a power transmission apparatus as the fourteenth aspect, the power transmission apparatus is provided with: a power transmitter circuit; and a contactless connector apparatus of one of the first to tenth aspects, the contactless connector apparatus connected to the power transmitter circuit.

According to a power transmission apparatus as the fifteenth aspect, the power transmission apparatus is provided with: a power receiver circuit; and a contactless connector apparatus of one of the first to tenth aspects, the contactless connector apparatus connected to the power receiver circuit.

According to a power transmission system as the sixteenth aspect, the power transmission system includes: a contactless connector system of one of the eleventh to thirteenth aspects; a power transmitter circuit connected to the transmitter contactless connector apparatus; and a power receiver circuit connected to the receiver contactless connector apparatus.

According to a contactless connector apparatus as the seventeenth aspect, the contactless connector apparatus is provided with a first coil closely opposed to a second coil so as to be electromagnetically coupled to the second coil. The first coil includes: an inner coil wound around an axis passing through a center of the first coil; and an outer coil wound around the axis and outside the inner coil. One end of the outer coil and one end of the inner coil are connected to each other such that, when a current flows through the first coil, a direction of a loop current generated around the axis by a current flowing through the inner coil is opposite to a direction of a loop current generated around the axis by a current flowing through the outer coil. The inner coil and the outer coil are configured such that a self-inductance of the outer coil is larger than a self-inductance of the inner coil. The inner coil and the outer coil are configured such that a mutual inductance between the inner coil and the second coil increases as a displacement of the second coil to the first coil increases, the displacement indicating a distance between the center of the first coil and a center of the second coil. The inner coil and the outer coil are configured such that a mutual inductance between the outer coil and the second coil decreases as the displacement of the second coil increases. The inner coil and the outer coil are configured such that when the center of the first coil and the center of the second coil are close to each other, a negative mutual inductance occurs between the inner coil and the second coil, a positive mutual inductance occurs between the outer coil and the second coil, and an absolute value of the mutual inductance between the outer coil and the second coil is larger than an absolute value of the mutual inductance between the inner coil and the second coil. The inner coil and the outer coil are configured such that the displacement of the second coil obtained when the mutual inductance between the outer coil and the second coil is zero is larger than the displacement of the second coil obtained when the mutual inductance between the inner coil and the second coil is zero.

According to a contactless connector system as the eighteenth aspect, the contactless connector system is provided with: a transmitter contactless connector apparatus provided with a first coil closely opposed to a second coil so as to be electromagnetically coupled to the second coil; and a receiver contactless connector apparatus provided with the second coil. The first coil includes: an inner coil wound around an axis passing through a center of the first coil; and an outer coil wound around the axis and outside the inner coil. One end of the outer coil and one end of the inner coil are connected to each other such that, when a current flows through the first coil, a direction of a loop current generated around the axis by a current flowing through the inner coil is opposite to a direction of a loop current generated around the axis by a current flowing through the outer coil. The inner coil and the outer coil are configured such that a self-inductance of the outer coil is larger than a self-inductance of the inner coil. The inner coil and the outer coil are configured such that a mutual inductance between the inner coil and the second coil increases as a displacement of the second coil to the first coil increases, the displacement indicating a distance between the center of the first coil and a center of the second coil. The inner coil and the outer coil are configured such that a mutual inductance between the outer coil and the second coil decreases as the displacement of the second coil increases. The inner coil and the outer coil are configured such that when the center of the first coil and the center of the second coil are close to each other, a negative mutual inductance occurs between the inner coil and the second coil, a positive mutual inductance occurs between the outer coil and the second coil, and an absolute value of the mutual inductance between the outer coil and the second coil is larger than an absolute value of the mutual inductance between the inner coil and the second coil, the displacement of the second coil obtained when the mutual inductance between the outer coil and the second coil is zero is larger than the displacement of the second coil obtained when the mutual inductance between the inner coil and the second coil is zero.

According to a contactless connector system as the nineteenth aspect, the contactless connector system is provided with a receiver contactless connector apparatus provided with a first coil closely opposed to a second coil so as to be electromagnetically coupled to the second coil; and a transmitter contactless connector apparatus provided with the second coil. The first coil includes: an inner coil wound around an axis passing through a center of the first coil; and an outer coil wound around the axis and outside the inner coil. One end of the outer coil and one end of the inner coil are connected to each other such that, when a current flows through the first coil, a direction of a loop current generated around the axis by a current flowing through the inner coil is opposite to a direction of a loop current generated around the axis by a current flowing through the outer coil. The inner coil and the outer coil are configured such that a self-inductance of the outer coil is larger than a self-inductance of the inner coil. The inner coil and the outer coil are configured such that a mutual inductance between the inner coil and the second coil increases as a displacement of the second coil to the first coil increases, the displacement indicating a distance between the center of the first coil and a center of the second coil. The inner coil and the outer coil are configured such that a mutual inductance between the outer coil and the second coil decreases as the displacement of the second coil increases. The inner coil and the outer coil are configured such that when the center of the first coil and the center of the second coil are close to each other, a negative mutual inductance occurs between the inner coil and the second coil, a positive mutual inductance occurs between the outer coil and the second coil, and an absolute value of the mutual inductance between the outer coil and the second coil is larger than an absolute value of the mutual inductance between the inner coil and the second coil. The inner coil and the outer coil are configured such that the displacement of the second coil obtained when the mutual inductance between the outer coil and the second coil is zero is larger than the displacement of the second coil obtained when the mutual inductance between the inner coil and the second coil is zero.

According to a contactless connector system as the twentieth aspect, the contactless connector system is provided with: a transmitter contactless connector apparatus provided with a transmitter coil closely opposed to a receiver coil so as to be electromagnetically coupled to a receiver coil; and a receiver contactless connector apparatus provided with the receiver coil. The transmitter coil includes: an inner transmitter coil wound around a first axis passing through a center of the transmitter coil; and an outer transmitter coil wound around the first axis and outside the inner transmitter coil. One end of the outer transmitter coil and one end of the inner transmitter coil are connected to each other such that, when a current flows through the transmitter coil, a direction of a loop current generated around the first axis by a current flowing through the inner transmitter coil is opposite to a direction of a loop current generated around the first axis by a current flowing through the outer transmitter coil. The inner transmitter coil and the outer transmitter coil are configured such that a self-inductance of the outer transmitter coil is larger than a self-inductance of the inner transmitter coil. The inner transmitter coil and the outer transmitter coil are configured such that a mutual inductance between the inner transmitter coil and the receiver coil increases as a displacement of the receiver coil to the transmitter coil increases, the displacement indicating a distance between the center of the transmitter coil and a center of the receiver coil. The inner transmitter coil and the outer transmitter coil are configured such that a mutual inductance between the outer transmitter coil and the receiver coil decreases as the displacement of the receiver coil increases. The inner transmitter coil and the outer transmitter coil are configured such that when the center of the transmitter coil and the center of the receiver coil are close to each other, a negative mutual inductance occurs between the inner transmitter coil and the receiver coil, a positive mutual inductance occurs between the outer transmitter coil and the receiver coil, and an absolute value of the mutual inductance between the outer transmitter coil and the receiver coil is larger than an absolute value of the mutual inductance between the inner transmitter coil and the receiver coil. The inner transmitter coil and the outer transmitter coil are configured such that the displacement of the receiver coil obtained when the mutual inductance between the outer transmitter coil and the receiver coil is zero is larger than the displacement of the receiver coil obtained when the mutual inductance between the inner transmitter coil and the receiver coil is zero. The receiver coil includes: an inner receiver coil wound around a second axis passing through the center of the receiver coil; and an outer receiver coil wound around the second axis and outside the inner receiver coil. One end of the outer receiver coil and one end of the inner receiver coil are connected to each other such that, when a current flows through the receiver coil, a direction of a loop current generated around the second axis by a current flowing through the inner receiver coil is opposite to a direction of a loop current generated around the second axis by a current flowing through the outer receiver coil. The inner receiver coil and the outer receiver coil are configured such that a self-inductance of the outer receiver coil is larger than a self-inductance of the inner receiver coil. The inner receiver coil and the outer receiver coil are configured such that a mutual inductance between the inner receiver coil and the transmitter coil increases as a displacement of the transmitter coil to the receiver coil increases, the displacement indicating a distance between the center of the receiver coil and the center of the transmitter coil. The inner receiver coil and the outer receiver coil are configured such that a mutual inductance between the outer receiver coil and the transmitter coil decreases as the displacement of the transmitter coil increases. The inner receiver coil and the outer receiver coil are configured such that when the center of the receiver coil and the center of the transmitter coil are close to each other, a negative mutual inductance occurs between the inner receiver coil and the transmitter coil, a positive mutual inductance occurs between the outer receiver coil and the transmitter coil, and an absolute value of the mutual inductance between the outer receiver coil and the transmitter coil is larger than an absolute value of the mutual inductance between the inner receiver coil and the transmitter coil. The inner receiver coil and the outer receiver coil are configured such that the displacement of the transmitter coil obtained when the mutual inductance between the outer receiver coil and the transmitter coil is zero is larger than the displacement of the transmitter coil obtained when the mutual inductance between the inner receiver coil and the transmitter coil is zero.

According to a power transmission apparatus as the twenty-first aspect, the power transmission apparatus is provided with: a power transmitter circuit; and a contactless connector apparatus connected to the power transmitter circuit. The contactless connector apparatus is provided with a first coil closely opposed to a second coil so as to be electromagnetically coupled to the second coil. The first coil includes: an inner coil wound around an axis passing through a center of the first coil; and an outer coil wound around the axis and outside the inner coil. One end of the outer coil and one end of the inner coil are connected to each other such that, when a current flows through the first coil, a direction of a loop current generated around the axis by a current flowing through the inner coil is opposite to a direction of a loop current generated around the axis by a current flowing through the outer coil, the inner coil and the outer coil are configured such that the inner coil and the outer coil are configured such that a self-inductance of the outer coil is larger than a self-inductance of the inner coil. The inner coil and the outer coil are configured such that a mutual inductance between the inner coil and the second coil increases as a displacement of the second coil to the first coil increases, the displacement indicating a distance between the center of the first coil and a center of the second coil. The inner coil and the outer coil are configured such that a mutual inductance between the outer coil and the second coil decreases as the displacement of the second coil increases. The inner coil and the outer coil are configured such that when the center of the first coil and the center of the second coil are close to each other, a negative mutual inductance occurs between the inner coil and the second coil, a positive mutual inductance occurs between the outer coil and the second coil, and an absolute value of the mutual inductance between the outer coil and the second coil is larger than an absolute value of the mutual inductance between the inner coil and the second coil. The inner coil and the outer coil are configured such that the displacement of the second coil obtained when the mutual inductance between the outer coil and the second coil is zero is larger than the displacement of the second coil obtained when the mutual inductance between the inner coil and the second coil is zero.

According to a power transmission apparatus as the twenty-second aspect, the power transmission apparatus is provided with: a power receiver circuit; and a contactless connector apparatus connected to the power receiver circuit. The contactless connector apparatus is provided with a first coil closely opposed to a second coil so as to be electromagnetically coupled to the second coil. The first coil includes: an inner coil wound around an axis passing through a center of the first coil; and an outer coil wound around the axis and outside the inner coil. One end of the outer coil and one end of the inner coil are connected to each other such that, when a current flows through the first coil, a direction of a loop current generated around the axis by a current flowing through the inner coil is opposite to a direction of a loop current generated around the axis by a current flowing through the outer coil. The inner coil and the outer coil are configured such that a self-inductance of the outer coil is larger than a self-inductance of the inner coil. The inner coil and the outer coil are configured such that a mutual inductance between the inner coil and the second coil increases as a displacement of the second coil to the first coil increases, the displacement indicating a distance between the center of the first coil and a center of the second coil. The inner coil and the outer coil are configured such that a mutual inductance between the outer coil and the second coil decreases as the displacement of the second coil increases. The inner coil and the outer coil are configured such that when the center of the first coil and the center of the second coil are close to each other, a negative mutual inductance occurs between the inner coil and the second coil, a positive mutual inductance occurs between the outer coil and the second coil, and an absolute value of the mutual inductance between the outer coil and the second coil is larger than an absolute value of the mutual inductance between the inner coil and the second coil. The inner coil and the outer coil are configured such that the displacement of the second coil obtained when the mutual inductance between the outer coil and the second coil is zero is larger than the displacement of the second coil obtained when the mutual inductance between the inner coil and the second coil is zero.

According to a power transmission system as the twenty-third aspect, the power transmission system is provided with: a contactless connector system provided with a transmitter contactless connector apparatus and a receiver contactless connector apparatus; a power transmitter circuit connected to the transmitter contactless connector apparatus; and a power receiver circuit connected to the receiver contactless connector apparatus. The transmitter contactless connector apparatus is provided with a transmitter coil closely opposed to a receiver coil so as to be electromagnetically coupled to a receiver coil. The a receiver contactless connector apparatus is provided with the receiver coil. The transmitter coil includes: an inner transmitter coil wound around a first axis passing through a center of the transmitter coil; and an outer transmitter coil wound around the first axis and outside the inner transmitter coil. One end of the outer transmitter coil and one end of the inner transmitter coil are connected to each other such that, when a current flows through the transmitter coil, a direction of a loop current generated around the first axis by a current flowing through the inner transmitter coil is opposite to a direction of a loop current generated around the first axis by a current flowing through the outer transmitter coil. The inner transmitter coil and the outer transmitter coil are configured such that a self-inductance of the outer transmitter coil is larger than a self-inductance of the inner transmitter coil. The inner transmitter coil and the outer transmitter coil are configured such that a mutual inductance between the inner transmitter coil and the receiver coil increases as a displacement of the receiver coil to the transmitter coil increases, the displacement indicating a distance between the center of the transmitter coil and a center of the receiver coil. The inner transmitter coil and the outer transmitter coil are configured such that a mutual inductance between the outer transmitter coil and the receiver coil decreases as the displacement of the receiver coil increases. The inner transmitter coil and the outer transmitter coil are configured such that when the center of the transmitter coil and the center of the receiver coil are close to each other, a negative mutual inductance occurs between the inner transmitter coil and the receiver coil, a positive mutual inductance occurs between the outer transmitter coil and the receiver coil, and an absolute value of the mutual inductance between the outer transmitter coil and the receiver coil is larger than an absolute value of the mutual inductance between the inner transmitter coil and the receiver coil. The inner transmitter coil and the outer transmitter coil are configured such that the displacement of the receiver coil obtained when the mutual inductance between the outer transmitter coil and the receiver coil is zero is larger than the displacement of the receiver coil obtained when the mutual inductance between the inner transmitter coil and the receiver coil is zero. The receiver coil includes: an inner receiver coil wound around a second axis passing through the center of the receiver coil; and an outer receiver coil wound around the second axis and outside the inner receiver coil. One end of the outer receiver coil and one end of the inner receiver coil are connected to each other such that, when a current flows through the receiver coil, a direction of a loop current generated around the second axis by a current flowing through the inner receiver coil is opposite to a direction of a loop current generated around the second axis by a current flowing through the outer receiver coil. The inner receiver coil and the outer receiver coil are configured such that a self-inductance of the outer receiver coil is larger than a self-inductance of the inner receiver coil. The inner receiver coil and the outer receiver coil are configured such that a mutual inductance between the inner receiver coil and the transmitter coil increases as a displacement of the transmitter coil to the receiver coil increases, the displacement indicating a distance between the center of the receiver coil and the center of the transmitter coil. The inner receiver coil and the outer receiver coil are configured such that a mutual inductance between the outer receiver coil and the transmitter coil decreases as the displacement of the transmitter coil increases. The inner receiver coil and the outer receiver coil are configured such that when the center of the receiver coil and the center of the transmitter coil are close to each other, a negative mutual inductance occurs between the inner receiver coil and the transmitter coil, a positive mutual inductance occurs between the outer receiver coil and the transmitter coil, and an absolute value of the mutual inductance between the outer receiver coil and the transmitter coil is larger than an absolute value of the mutual inductance between the inner receiver coil and the transmitter coil. The inner receiver coil and the outer receiver coil are configured such that the displacement of the transmitter coil obtained when the mutual inductance between the outer receiver coil and the transmitter coil is zero is larger than the displacement of the transmitter coil obtained when the mutual inductance between the inner receiver coil and the transmitter coil is zero.

INDUSTRIAL APPLICABILITY

According to a contactless connector apparatus, a contactless connector system, a power transmission apparatus, and a power transmission system of the present disclosure, it is possible to achieve stable power transmission with sufficiently high transmission efficiency, with a very simple configuration, even when a position displacement occurs between a transmitter coil and a receiver coil.

In addition, it is conventionally necessary to increase transmission power in order to deal with a reduction in transmission efficiency, thus resulting in increased heat generation. On the other hand, the transmission efficiency does not decrease in the contactless connector apparatus, the contactless connector system, the power transmission apparatus, and the power transmission system of the present disclosure, and thus, there is an effect of preventing heat generation.

REFERENCE SIGNS LIST 1, 1a, 1b, 1aa, 1ba, 1ab, 1bb, 1ac, 1bc, 1c, 1d, 31-1 to 31-3, 32-1 to 32-3, 41a, and 41b: TRANSMITTER COIL,
2, 2a, 2b, 42a, and 42b: RECEIVER COIL,
3, 3A to 3D, 4, and 7: CONNECTING ELEMENT,
5, 6, and 6A to 6C: CONDUCTING WIRE,
11 and 12: HOUSING,
13 and 16: MAGNETIC SUBSTRATE,
14: DIELECTRIC SUBSTRATE,
15, 15A, 15B1 to 15B3, 15C, and 15D: VIA CONDUCTOR,
21: IMPEDANCE ELEMENT,
101: POWER SUPPLY,
102: POWER TRANSMITTER CIRCUIT,
103: POWER RECEIVER CIRCUIT,
104: LOAD,
C1 and C2: CAPACITOR,
G1 and G2: GROOVE,
L1 and L2: SELF-INDUCTANCE,
M: MUTUAL INDUCTANCE,
P1 to P14: TERMINAL,
R1 and R2: RESISTANCE COMPONENT,
Q: SIGNAL SOURCE, and
Z01 and Z02: LOAD IMPEDANCE.

The invention claimed is:

1. A contactless connector apparatus comprising a first coil closely opposed to a second coil so as to be electromagnetically coupled to the second coil,
wherein the first coil includes: an inner coil wound around an axis passing through a center of the first coil; and an outer coil wound around the axis and outside the inner coil,
wherein one end of the outer coil and one end of the inner coil are connected to each other such that, when a current flows through the first coil, a direction of a loop current generated around the axis by a current flowing through the inner coil is opposite to a direction of a loop current generated around the axis by a current flowing through the outer coil, and
wherein the inner coil and the outer coil are configured such that:
a self-inductance of the outer coil is larger than a self-inductance of the inner coil,
a mutual inductance between the inner coil and the second coil increases as a displacement of the second coil to the first coil increases, the displacement indicating a distance between the center of the first coil and a center of the second coil,
a mutual inductance between the outer coil and the second coil decreases as the displacement of the second coil increases,
when the center of the first coil and the center of the second coil are close to each other, a negative mutual inductance occurs between the inner coil and the second coil, a positive mutual inductance occurs between the outer coil and the second coil, and an absolute value of the mutual inductance between the outer coil and the second coil is larger than an absolute value of the mutual inductance between the inner coil and the second coil,
the displacement of the second coil obtained when the mutual inductance between the outer coil and the second coil is zero is larger than the displacement of the second coil obtained when the mutual inductance between the inner coil and the second coil is zero.

2. The contactless connector apparatus as claimed in claim 1,
wherein a ratio of the self-inductance of the inner coil to the self-inductance of the outer coil is greater than 0 and less than 0.45.

3. The contactless connector apparatus as claimed in claim 1,
wherein a direction in which the inner coil is wound around the axis is opposite to a direction in which the outer coil is wound around the axis.

4. The contactless connector apparatus as claimed in claim 1,
wherein a direction in which the inner coil is wound around the axis is same as a direction in which the outer coil is wound around the axis.

5. The contactless connector apparatus as claimed in claim 1, further comprising a magnetic substrate provided on one side with respect to the first coil, the one side being opposite to a side where the second coil is provided close to the first coil.

6. The contactless connector apparatus as claimed in claim 5, further comprising a conducting wire connected to the first coil,
wherein the magnetic substrate has a groove into which at least a part of the first coil and the conducting wire is inserted.

7. The contactless connector apparatus as claimed in claim 1,
wherein the first coil has a first end close to the axis and a second end remote from the axis, and
wherein the contactless connector apparatus further comprises a conducting wire connected to the first end, and the conducting wire is wound around the axis so as to gradually increase a distance from the axis.

8. The contactless connector apparatus as claimed in claim 1,
wherein each of the outer coil and the inner coil is formed on at least one surface of a printed circuit board using a circuit patterning method.

9. The contactless connector apparatus as claimed in claim 1,
wherein one end of the outer coil and one end of the inner coil are connected to each other through an impedance element, and the impedance element is one of a resistor, a capacitor, an inductor, and a current inverter circuit.

10. The contactless connector apparatus as claimed in claim 1, comprising a plurality of first coils wound around a plurality of parallel axes located at regular intervals, respectively.

11. The contactless connector apparatus as claimed in claim 1,
wherein the first coil and the second coil are wound around the axis, over substantially the same range from the axis.

12. A contactless connector system comprising:
a transmitter contactless connector apparatus comprising a first coil closely opposed to a second coil so as to be electromagnetically coupled to the second coil; and
a receiver contactless connector apparatus comprising the second coil, wherein the first coil includes: an inner coil wound around an axis passing through a center of the first coil; and an outer coil wound around the axis and outside the inner coil, wherein one end of the outer coil and one end of the inner coil are connected to each other such that, when a current flows through the first coil, a direction of a loop current generated around the axis by a current flowing through the inner coil is opposite to a direction of a loop current generated around the axis by a current flowing through the outer coil, and wherein the inner coil and the outer coil are configured such that:

a self-inductance of the outer coil is larger than a self-inductance of the inner coil, a mutual inductance between the inner coil and the second coil increases as a displacement of the second coil to the first coil increases, the displacement indicating a distance between the center of the first coil and a center of the second coil, a mutual inductance between the outer coil and the second coil decreases as the displacement of the second coil increases, when the center of the first coil and the center of the second coil are close to each other, a negative mutual inductance occurs between the inner coil and the second coil, a positive mutual inductance occurs between the outer coil and the second coil, and an absolute value of the mutual inductance between the outer coil and the second coil is larger than an absolute value of the mutual inductance between the inner coil and the second coil, the displacement of the second coil obtained when the mutual inductance between the outer coil and the second coil is zero is larger than the displacement of the second coil obtained when the mutual inductance between the inner coil and the second coil is zero.

13. A power transmission apparatus comprising:

a power transmitter circuit; and a contactless connector apparatus connected to the power transmitter circuit, wherein the contactless connector apparatus comprises a first coil closely opposed to a second coil so as to be electromagnetically coupled to the second coil, wherein the first coil includes: an inner coil wound around an axis passing through a center of the first coil; and an outer coil wound around the axis and outside the inner coil, wherein one end of the outer coil and one end of the inner coil are connected to each other such that, when a current flows through the first coil, a direction of a loop current generated around the axis by a current flowing through the inner coil is opposite to a direction of a loop current generated around the axis by a current flowing through the outer coil, and wherein the inner coil and the outer coil are configured such that:

a self-inductance of the outer coil is larger than a self-inductance of the inner coil, a mutual inductance between the inner coil and the second coil increases as a displacement of the second coil to the first coil increases, the displacement indicating a distance between the center of the first coil and a center of the second coil, a mutual inductance between the outer coil and the second coil decreases as the displacement of the second coil increases, when the center of the first coil and the center of the second coil are close to each other, a negative mutual inductance occurs between the inner coil and the second coil, a positive mutual inductance occurs between the outer coil and the second coil, and an absolute value of the mutual inductance between the outer coil and the second coil is larger than an absolute value of the mutual inductance between the inner coil and the second coil, the displacement of the second coil obtained when the mutual inductance between the outer coil and the second coil is zero is larger than the displacement of the second coil obtained when the mutual inductance between the inner coil and the second coil is zero.

\* \* \* \* \*